United States Patent
Nakamura

(10) Patent No.: US 7,640,907 B2
(45) Date of Patent: Jan. 5, 2010

(54) APPARATUS AND METHOD FOR CONTROLLING INTERNAL COMBUSTION ENGINE

(75) Inventor: Munenori Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 181 days.

(21) Appl. No.: 11/794,696

(22) PCT Filed: Feb. 22, 2006

(86) PCT No.: PCT/JP2006/003821

§ 371 (c)(1),
(2), (4) Date: Jul. 3, 2007

(87) PCT Pub. No.: WO2006/090890

PCT Pub. Date: Aug. 31, 2006

(65) Prior Publication Data

US 2008/0215225 A1  Sep. 4, 2008

(30) Foreign Application Priority Data

Feb. 25, 2005  (JP) .............................. 2005-051861

(51) Int. Cl.
*F02N 17/00* (2006.01)
*G06F 19/00* (2006.01)
(52) U.S. Cl. ................. 123/179.1; 123/491; 701/113
(58) Field of Classification Search ............. 123/179.1, 123/179.3, 179.5, 491; 701/101, 103, 104, 701/111, 112, 113
See application file for complete search history.

(56) References Cited

U.S. PATENT DOCUMENTS

| 5,447,143 A | | 9/1995 | Ott et al. |
| 6,035,826 A | * | 3/2000 | Matsuoka ............... 123/406.62 |
| 6,732,713 B1 | * | 5/2004 | Kanazawa et al. .......... 123/476 |
| 6,907,342 B1 | * | 6/2005 | Matsuoka .................... 701/113 |
| 7,079,939 B2 | * | 7/2006 | Kataoka et al. ............. 701/112 |
| 2004/0153235 A1 | * | 8/2004 | Kataoka et al. ............. 701/112 |
| 2005/0120782 A1 | | 6/2005 | Kishibata et al. |

(Continued)

FOREIGN PATENT DOCUMENTS

EP  1 396 629 A2  3/2004

(Continued)

*Primary Examiner*—John T Kwon
(74) *Attorney, Agent, or Firm*—Oliff & Berridge, PLC

(57) ABSTRACT

A variable valve timing mechanism 9 includes an electric motor 10 coupled to an intake camshaft 7. A plurality of rotation sensors 18 to 20 are located about the rotor 17 of the electric motor 10. Each of the sensors 18 to 20 outputs a signal corresponding to induced voltage generated by rotation of the rotor 17. Based on the signals form the rotation sensors 18 to 20, reverse rotation of an engine is detected. A counter C is decremented every time a crank signal is output after the occurrence of reverse rotation is detected. Further, a subtraction value Y is computed that corresponds to a discrepancy between the counter C and the actual crank angle caused by a discrepancy between the actual point in time of the occurrence of reverse rotation and the point in time of the detection of the reverse rotation. The counter C is reduced by the subtraction value Y. As a result, reverse direction of the engine is readily detected without providing a dedicated sensor, and the counter is reliably caused to correspond to the actual crank angle.

10 Claims, 21 Drawing Sheets

U.S. PATENT DOCUMENTS

2005/0212513 A1 9/2005 Yamashita et al.
2006/0042578 A1 3/2006 Izumi et al.

FOREIGN PATENT DOCUMENTS

| EP | 1 571 426 A2 | 9/2005 |
| JP | B2 6-50107 | 6/1994 |
| JP | A 08-144825 | 6/1996 |
| JP | A 2004-150397 | 5/2004 |
| JP | A 2004-194454 | 7/2004 |
| WO | WO 2006/029592 A1 | 3/2006 |

* cited by examiner

APPARATUS AND METHOD FOR CONTROLLING INTERNAL COMBUSTION ENGINE

FIELD OF THE INVENTION

The present invention relates to an apparatus and a method for controlling an internal combustion engine.

BACKGROUND OF THE INVENTION

In an internal combustion engine such as an automobile engine, the crank angle is acquired based on a crank signal and a cam signal. Based on the crank angle, fuel injection and ignition are performed (refer to Japanese Laid-Open Patent Publication No. 8-144825).

The crank signal is output by a crank position sensor located in the vicinity of a crank rotor attached to the crankshaft as the crankshaft rotates, for example, at every 30° of crank angle. The profile of the crank rotor is shaped such that the crank signal at equal intervals is output from the crank position sensor. On the other hand, the cam signal is output by a cam position sensor located in the vicinity of a cam rotor attached to a camshaft as the camshaft rotates at every 360° rotation of the camshaft (720° of crank angle). The profile of the cam rotor is shaped such that the cam signal is output from the cam position sensor. The output intervals of the cam signal are set longer than the output intervals of the crank signal (at every 30° CA). This is because the cam signal is used only for distinguishing the cylinders, and does not need to be output at a short interval such as 30° CA like the crank signal.

When acquiring the crank angle based on the crank signal and the cam signal, a counter that is incremented, for example, at every output of the crank signal is used. When the crankshaft and the camshaft are rotated by a certain amount by a starter after starting of the engine is initiated, and the crank angle is first determined to be 0° based on the crank signal and the cam signal, the counter is set to 0. Thereafter, the counter is incremented at every output of the crank signal. When one cycle of the engine that starts from 0° of crank angle is complete, in other words, when the crank angle reaches 720° and the counter has a value corresponding to 720° CA, the counter is set back to 0. Therefore, from 0° CA to 720° CA, the counter is increased by 1 at every 30° of crank angle, and the crank angle is acquired based on the counter.

To improve the starting performance of an internal combustion engine, it is preferable that injection and ignition are started at an early stage after starting of the engine is initiated. Therefore, it may be configured that when the operation of the engine is terminated (when the crankshaft stops), the value of the counter is stored, and in the subsequent starting of the engine, the stored counter value is used as the initial value of the counter, so that the counter value is continuously used in the engine operations before and after the stop of the engine. Such transfer of the counter value permits the crank angle to be acquired immediately after the starting of the engine is initiated. Based on the crank angle, fuel injection and ignition can be executed at an early stage after the starting of the engine is initiated.

However, when the engine is stopped, after the stop of fuel injection and ignition, the engine speed is gradually reduced by rotational resistance due to the pressure in combustion chambers in the compression stroke. Finally, the engine rotation is stopped after the engine is rotated in the reverse direction by the pressure in the combustion chambers. Thus, if the counter is simply incremented at every output of the crank signal, a discrepancy occurs between the counter and the actual crank angle after the reverse rotation takes place. This is because after the reverse rotation, the counter is incremented despite the fact that the actual crank angle is reduced at every output of the crank signal. Therefore, when reverse rotation occurs, the value of the counter when the crankshaft stops does not correspond to the actual crank angle unless a measure is taken to match the counter value with the actual crank angle.

To take such a measure, the occurrence of reverse rotation must be detected. Since the output patterns of the crank signal and the cam signal are substantially the same during the forward rotation and the reverse rotation of the engine, the occurrence of reverse rotation can be hardly detected based on such output patterns. Hence, the technique disclosed in Japanese Examined Patent Publication No. 6-50107 may be used to detect the occurrence of reverse rotation of an internal combustion engine. Japanese Examined Patent Publication No. 6-50107 discloses the technique in which two crank position sensors are provided in such a manner that, during forward rotation of the engine, the two crank position sensors output crank signals at different timings. In this case, the state of discrepancy between the crank signals from the two sensors is designed be different between the forward rotation and the reverse rotation of the engine. Thus, based on the state of discrepancy, the occurrence of reverse rotation is detected.

If a configuration is applied in which the occurrence of reverse rotation of an internal combustion engine is detected by using the technique disclosed in Japanese Examined Patent Publication No. 6-50107 as described above, the actual occurrence of reverse rotation is detected at a relatively early stage after the occurrence. This is because a change of the state of discrepancy due to reverse rotation of the engine occurs at an early stage after the actual reverse rotation occurs. However, since this configuration for detecting reverse rotation requires two crank position sensors, the installation of an additional crank position sensor is inevitably troublesome and costly.

Although the occurrence of reverse rotation is detected at an early stage after the actual occurrence, there is a time lag between the actual occurrence and the detection. Thus, in a period corresponding to the time lag, the above shown measure cannot be taken. That is, the implementation of the measure is delayed due to the time lag. As a result, a discrepancy corresponding to the delay of the implementation remains between the counter and the actual crank angle even after implementing the measure. Accordingly, it is difficult to match the value of the counter at the time of stopping of the crankshaft with the actual crank angle.

Then, the counter value that does not correspond to the actual crank angle at the time of stopping of the crankshaft is stored and used as the initial value of the counter in the subsequent starting of the engine. Accordingly, the crank angle acquired based on the counter after initiating the starting of the engine will have an erroneous value. As a result, the first fuel injection and ignition after initiating the starting of the engine cannot be executed at an appropriate time (crank angle). The starting performance of the engine therefore cannot be improved.

SUMMARY OF THE INVENTION

Accordingly, it is an objective of the present invention to provide an apparatus and a method for controlling an internal combustion engine, which apparatus and method readily detect the occurrence of reverse rotation of the engine without an additional sensor, and reliably match the counter at the stopping of the crankshaft with the actual crank angle, thereby improving the starting performance of the engine in the subsequent engine operation.

To achieve the foregoing and other objectives and in accordance with the purpose of the present invention, a control apparatus for an internal combustion engine is provided. The engine includes a crankshaft, a camshaft for actuating a valve of the engine, a crank position sensor that outputs a crank signal every time the crankshaft rotates a certain angle, and a rotating electrical machine having a rotor that is coupled to one of the crankshaft and the camshaft. The control apparatus acquires a crank angle based on a counter that is incremented every time the crank signal is output, and controls the engine based on the acquired crank angle. The apparatus includes a plurality of rotation sensors, a detection section, a decrement section, a subtraction section, and an initial value setting section. The rotation sensors are located about the rotor. Each sensor outputs a signal corresponding to induced voltage generated by rotation of the rotor. The control apparatus controls the rotating electrical machine based on the signals from the rotation sensors. The detection section detects the occurrence of reverse rotation of the engine when an output pattern of the signals from the rotation sensors is different from an output pattern during forward rotation of the engine. The decrement section decrements the counter every time the crank signal is output after the occurrence of reverse rotation is detected. The subtraction section computes a subtraction value. The subtraction value corresponds to a discrepancy between the counter and the actual crank angle caused by a discrepancy between the actual point in time of the occurrence of reverse rotation and the point in time of the detection of the reverse rotation. The subtraction section reduces the counter by the subtraction value. The initial value setting section stores a count value of the counter at the time of stopping the engine, and sets the stored count value as an initial value of the counter in the subsequent starting of the engine.

The present invention also provides a control method for an internal combustion engine. The engine includes a crankshaft, a camshaft for actuating a valve of the engine, and a rotating electrical machine having a rotor that is coupled to one of the crankshaft and the camshaft. The method includes: outputting a crank signal from a crank position sensor every time the crankshaft rotates by a certain angle; acquiring a crank angle based on a counter that is incremented every time the crank signal is output, and controlling the engine based on the acquired crank angle; outputting, from a plurality of rotation sensors located about the rotor, signals corresponding to induced voltage generated by rotation of the rotor; controlling the rotating electrical machine based on the signals from the rotation sensors; detecting the occurrence of reverse rotation of the engine when an output pattern of the signals from the rotation sensors is different from an output pattern during forward rotation of the engine; decrementing the counter every time the crank signal is output after the occurrence of reverse rotation is detected; computing a subtraction value that corresponds to a discrepancy between the counter and the actual crank angle caused by a discrepancy between the actual point in time of the occurrence of reverse rotation and the point in time of the detection of the reverse rotation, and reducing the counter by the subtraction value; storing a count value of the counter at the time of stopping the engine; and setting the stored count value as an initial value of the counter in the subsequent starting of the engine.

DETAILED DESCRIPTION OF THE PREFERRED EMBODIMENTS

An automobile multi-cylinder engine 1 according to a preferred embodiment of the present invention will now be described with reference to FIGS. 1 to 22.

Figure 1:
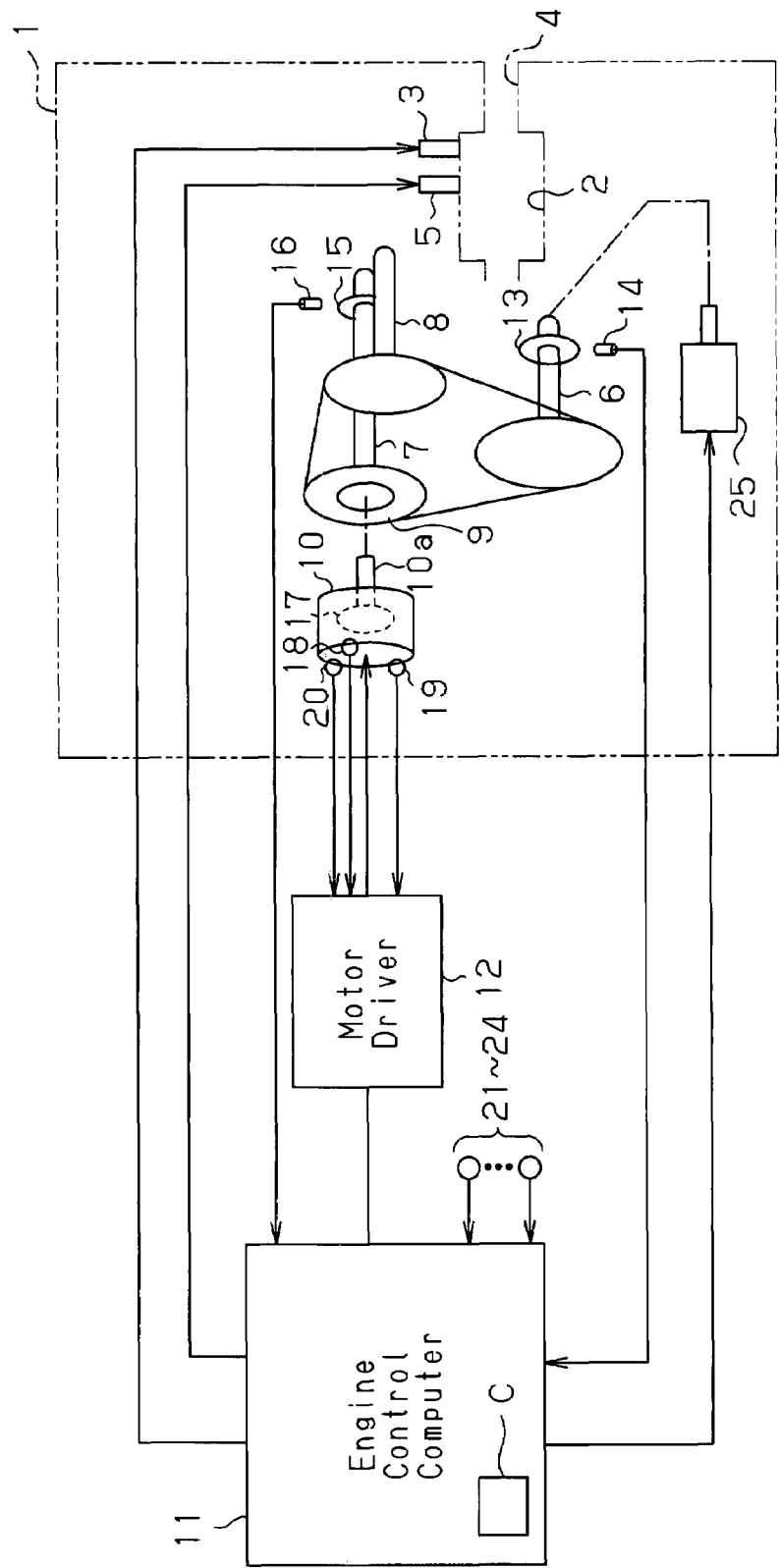
FIG. 1 is a diagrammatic view illustrating an entire engine to which a control apparatus according to one embodiment is applied.

As shown in FIG. 1, the engine 1 has combustion chambers 2 (only one is shown) into each of which fuel is injected from a fuel injection valve 3. Also, air is drawn into each combustion chamber 2 from an intake passage 4. The air-fuel mixture in each combustion chamber 2 is ignited by an ignition plug 5. When such ignition of air-fuel mixture occurs so that the air-fuel mixture is burned, the combustion energy drives engine 1, in other words, rotates a crankshaft 6. A starter 25 is connected to the crankshaft 6. The starter 25 forcibly rotates the crankshaft 6 when starting the engine 1 (cranks the engine 1).

Rotation of the crankshaft 6 is transmitted to an intake camshaft 7 and an exhaust camshaft 8. The rotation transmitted from the crankshaft 6 causes the camshafts 7, 8 to rotate 360° per 720° rotation of the crankshaft 6. The rotation of the intake camshaft 7 and the exhaust camshaft 8 open and close intake valves and exhaust valves of the engine 1.

The intake camshaft 7 is provided with a variable valve timing mechanism 9. The variable valve timing mechanism 9 changes the rotational phase of the intake camshaft 7 relative to the crankshaft 6, thereby advancing or retarding the valve timing of the intake valves. The variable valve timing mechanism 9 is an electric type having an electric motor 10. The electric motor 10 has an output shaft 10a coupled to the intake camshaft 7. The electric motor 10 is controlled to change the rotational phase of the intake camshaft 7 relative to the crankshaft 6. The electric motor 10 is a three-phase alternating current motor that includes an excitation coil wound about a rotor 17 coupled to the output shaft 10a, and armature coils for U-phase, V-phase, and W-phase wound about a stator (not shown). The output shaft 10a of the electric motor 10 is coupled to and integrally rotates with the intake camshaft 7.

The rotation speed of the output shaft 10a is increased or decreased by controlling the electric motor 10. When the rotation speed of the output shaft 10a is set higher than the rotation speed of the intake camshaft 7, the rotation speed of the intake camshaft 7 is increased so that the rotational phase of the intake camshaft 7 is advanced relative to that of the crankshaft 6. As a result, the valve timing of the intake valves is advanced. When the rotation speed of the output shaft 10a is set lower than the rotation speed of the intake camshaft 7, the rotation speed of the intake camshaft 7 is reduced so that the rotational phase of the intake camshaft 7 is retarded relative to that of the crankshaft 6. As a result, the valve timing of the intake valves is retarded.

A detector that detects the rotation state of the crankshaft 6 and the intake camshaft 7 will now be described.

Figure 2:
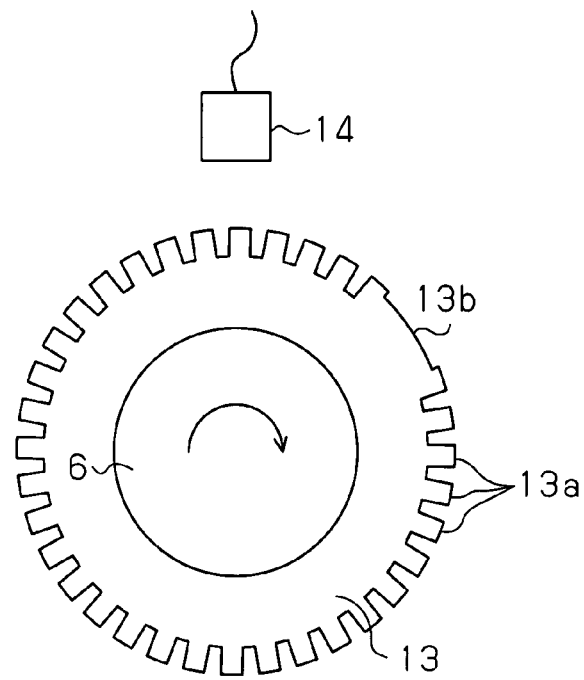
FIG. 2 is an enlarged diagram illustrating a crank rotor and a crank position sensor.

A crank rotor 13 is attached to the crankshaft 6, and a crank position sensor 14 is located in the vicinity of the crank rotor 13. FIG. 2 is an enlarged diagram illustrating a crank rotor 13 and a crank position sensor 14. As shown in FIG. 2, thirty four projections 13a are formed on the outer circumference of the crank rotor 13 about the axis of the crankshaft 6 at predetermined angular intervals (10° in this embodiment). Also, one tooth missing portion 13b is formed on the outer circumference of the crank rotor 13. As the crankshaft 6 rotates, each of the projections 13a and the tooth missing portion 13b passes by the crank position sensor 14. As a result, the crank position sensor 14 outputs a crank signal shown in section (a) of FIG. 4. The crank signal contains pulses that occur every time the crank angle advances by 10° and sections that correspond to the tooth missing portion 13b at 180° and 540° of the crank angle. Each of the sections that correspond to the tooth missing portion 13b has a width equivalent to three pulses of the crank signal, which correspond to three of the projections 13a. The crank signal output by the crank position sensor 14 is used for obtaining the rotation speed of the engine 1.

Figure 3:
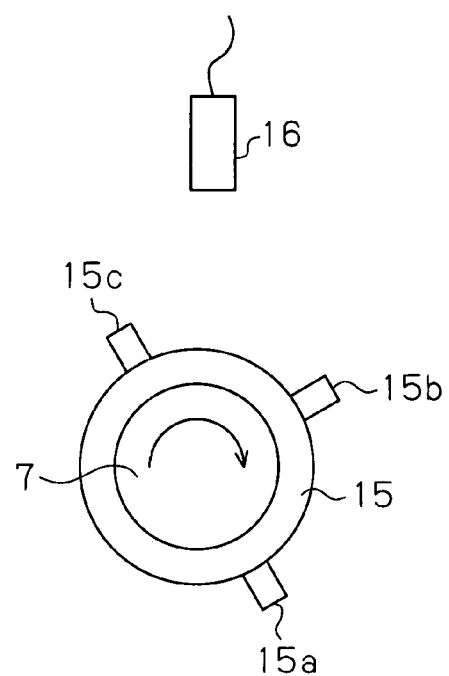
FIG. 3 is an enlarged diagram illustrating a cam rotor and a cam position sensor.

As shown in FIG. 1, a cam rotor 15 is attached to the intake camshaft 7, and a cam position sensor 16 is located in the vicinity of the cam rotor 15. FIG. 3 is an enlarged diagram illustrating a cam rotor 15 and a cam position sensor 16. As shown in FIG. 3, three projections 15a to 15c are provided on the outer circumference of the cam rotor 15. The angular intervals of the projections 15a to 15c about the axis of the intake camshaft 7 are set as follows. That is, the angular interval between the projection 15a and the projection 15b is 90°, the angular interval between the projection 15b and the projection 15c is 90°, and the angular interval between the projection 15c and the projection 15a is 180°. As the intake camshaft 7 rotates, the projections 15a to 15c of the cam rotor 15 consecutively pass by the cam position sensor 16. As a result, the cam position sensor 16 outputs a cam signal shown in section (b) of FIG. 4. The cam signal contains pulses that occur at the crank angles of 10°, 180°, 360°, which correspond to the projections 15a to 15c. The cam signal output by the cam position sensor 16 is used for distinguishing the cylinders of the engine 1 and detecting the valve timing of the intake valves.

A detector for detecting the rotation state of the motor 10 will now be described.

As shown in FIG. 1, the electric motor 10 has three rotation sensors, or first to third rotation sensors 18 to 20 provided at equal intervals about the rotor 17 attached to the output shaft 10a. When the motor rotor 17 rotates along with rotation of the output shaft 10a, which rotates integrally with the crankshaft 6 and the intake camshaft 7, the first to third rotation sensors 18 to 20 each output a square signal corresponding to induced voltage generated by the rotation as shown in sections (c) to (e) of FIG. 4. As shown in sections (c) to (e) of FIG. 2, each of the square signals output by the first to third rotation sensors 18 to 20 repeats rising edges and falling edges every 90° of crank angle. The square signals are displaced by 60° of crank angle from one another. The signals from the first to third rotation sensors 18 to 20 are used for obtaining the rotation speed and rotational position of the motor 10 (the output shaft 10a) when the motor 10 is controlled for varying the valve timing of the intake valves.

The electric configuration of a control apparatus for the engine 1 will now be described with reference to FIG. 1.

The control apparatus includes an engine control computer 11 that executes control processes for the engine 1 such as a fuel injection control, an ignition timing control, an intake valve timing control, and a control process for the starter 25. The engine control computer 11 includes a CPU that executes computation processes related to control of the engine 1, a ROM storing programs and data necessary for the controls, a RAM for temporarily storing the computation results of the CPU, and input and output ports for inputting and outputting signals from and to the outside. The engine control computer 11 functions as a decrement section, a subtraction section, and an initial value setting section.

As well as the crank position sensor 14 and the cam position sensor 16, various sensors are connected to the engine control computer 11. The sensors include:

an accelerator pedal position sensor 21 for detecting the depression degree of an accelerator pedal, which is depressed by a driver of the vehicle;

a throttle position sensor 22 for detecting the open degree of a throttle valve located in the intake passage 4 of the engine 1;

an airflow meter 23 for detecting the flow rate of air drawn into the combustion chamber 2 through the intake passage 4; and an ignition switch 24, which is switched to any of four switching positions including "off", "accessory", "on", and "start" and outputs a signal corresponding to the current switching position.

The engine control computer 11 is connected to an electric motor driver 12 for driving the electric motor 10. The motor driver 12 is connected to the first to third rotation sensors 18 to 20. The engine control computer 11 outputs command signals to the motor driver 12, thereby controlling the electric motor 10. Upon receiving the signals shown in sections (c) to (e) of FIG. 4 from the first to third rotation sensors 18 to 20, the motor driver 12 outputs the signals to the engine control computer 11. The engine control computer 11 and the motor driver 12 function as a detection section that detects reverse rotation of the engine 1.

The engine control computer 11 acquires the engine operating state based on detection signals from the above described sensors. According to the acquired engine operating state, the engine control computer 11 operates the fuel injection valves 3, the ignition plugs 5, and the electric motor 10, thereby executing the fuel injection control for the fuel injection valves 3, the ignition timing control for the ignition plugs 5, and the intake valve timing control. When controlling the electric motor 10 for controlling the intake valve timing, the engine control computer 11, based on the signals from the rotation sensors 18 to 20, acquires the current driving state of the electric motor 10, that is, the rotation speed and the rotational position of the output shaft 10a. The engine control computer 11 drives the electric motor 10 by taking the current driving state into consideration. The current driving state is taken into consideration when driving the electric motor 10 for properly driving the electric motor 10.

Among the various types of control processes for the engine 1, the fuel injection control and the ignition control are realized by injecting and igniting fuel based on the crank angle of the engine 1. Thus, to perform fuel injection and ignition in the engine 1, the crank angle of the engine 1 needs to be acquired. When acquiring the crank angle, a counter C (see FIG. 1) that is incremented based on the crank signal is used. The counter C is provided in, for example, the engine control computer 11. The counter C uses the 0° of crank angle as a reference, and incremented (addition of 1) every time the crank signal corresponding to the projections 13a is output. Since a single output of the crank signal corresponding to the tooth missing portion 13b corresponds to three outputs of the crank signal corresponding to the projections 13a, the counter C is incremented by 3 when the crank signal corresponding to the tooth missing portion 13b is output. When the counter C is equal to a value that corresponds to the crank angle when one cycle of the engine 1 that starts from 0° of crank angle ends, or 72 (720° CA), the counter C is returned to 0. Therefore, from 0° CA to 720° CA, the counter C is increased by 1 at every 10° of crank angle, and the crank angle is acquired based on the counter C.

Next, starting and stopping of the engine 1 will be described.

In general, starting and stopping of the engine 1 are performed through control of the starter 25 and control of the fuel injection and ignition by the engine control computer 11 based on the operation of the ignition switch 24.

That is, when an occupant of the automobile turns the ignition switch 24 from "off" through "accessory" and "on" to "start" with the engine stopped, a starting command for the engine 1 is generated as the ignition switch 24 is turned to "start", and cranking of the engine 1 is started through activation of the starter 25. During cranking, fuel and air is supplied to the combustion chamber 2 and air-fuel mixture is ignited, so that the autonomous operation of the engine 1 is started. After the autonomous operation of the engine 1 has been started, the ignition switch 24 is turned to "on", and cranking by activation of the starter 25 is stopped.

Also, when the occupant of the automobile turns the ignition switch 24 from "on" through "accessory" to "off" with the engine running, fuel injection from the fuel injection valve 3 and ignition by the ignition plug 5 are stopped as the ignition switch 24 is turned to "accessory". Then, combustion of the air-fuel mixture is no longer performed, thus stopping the engine 1. Since the ignition switch 24 is generally turned from "on" to "accessory" during idling, after the process for stopping the engine 1 is started as described above, the engine rotation speed is gradually reduced from the idle rotation speed due to the rotational resistance caused by the pressure in the combustion chambers 2 during the compression stroke. Finally, the engine 1 rotates in reverse once due to the pressure in the combustion chambers 2, and then the engine rotation is stopped.

To improve the starting performance of the engine 1, it is preferable that the crank angle be acquired at as early a stage as possible after the engine starting is initiated, and fuel injection and ignition be started at as early a stage as possible based on the crank angle. Therefore, the value of the counter C when the operation of the engine 1 is stopped (when the crankshaft 6 stops) may be stored in a nonvolatile RAM provided in the engine control computer 11, and the stored counter value may be used as an initial value when initiating the subsequent starting of the engine. In this case, the counter value is continuously used in the engine operations before and after the stop of the engine. Therefore, the crank angle can be acquired based on the counter C immediately after the starting of the engine is initiated. Based on the crank angle, fuel injection and ignition can be executed at an early stage after the starting of the engine is initiated.

However, when the engine 1 is stopped after being operated, the engine rotation is stopped after the engine is rotated in the reverse direction. After the occurrence of the reverse rotation, the counter C is incremented at every output of the crank signal despite the fact that the actual crank angle is diminishing. This results in a discrepancy between the counter C and the actual crank angle. If no countermeasure is taken against such a discrepancy, the value of the counter C when the crankshaft 6 stops will not correspond to the actual crank angle. To take such a countermeasure, reverse rotation of the engine 1 needs to be detected. To detect reverse rotation of the engine 1, for example, a method described in BACKGROUND ART may be employed. However, in the method for detecting reverse rotation described in BACKGROUND ART, an additional crank position sensor needs to be provided to promptly detect reverse rotation after the occurrence of reverse rotation. This is inevitably troublesome and costly.

Therefore, in the preferred embodiment, reverse rotation of the engine 1 is detected using signals from the first to third rotation sensors 18 to 20, so that reverse rotation is promptly detected after the actual occurrence. Further, since the first to third rotation sensors 18 to 20, which are existing components provided on the electric motor 10 to control the electric motor 10 of the variable valve timing mechanism 9, are used for detecting the occurrence of reverse rotation, the occurrence of reverse rotation is detected without providing additional sensors.

Next, detection of reverse rotation of the engine 1 using signals from the first to third rotation sensors 18 to 20 will be described with reference to the timing chart of FIG. 4.

The horizontal axis of the timing chart represents variation of the crank angle during forward rotation of the engine 1. The crank angle is determined based on the crank signal shown in section (a) of FIG. 4 and the cam signal shown in section (b) of FIG. 4.

Figure 4:
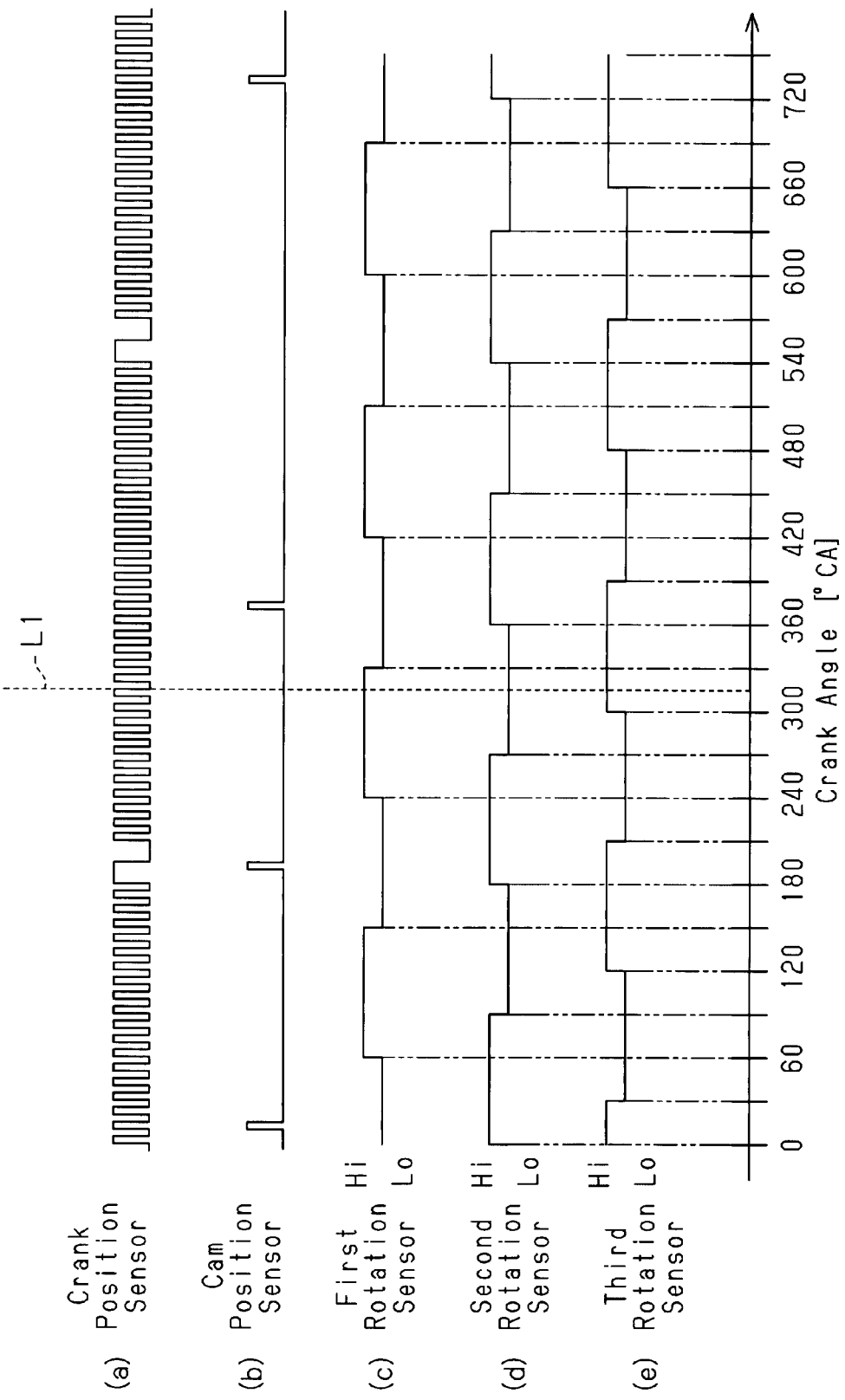
FIG. 4 is a timing chart showing a situation where a crank angle changes, in which section (a) shows the waveform of a crank signal from a crank position sensor, section (b) shows the waveform of a cam signal from a cam position sensor, and sections (c), (d), and (e) show the waveforms of signals from first to third rotation sensors.

The output patterns of the signals from the first to third rotation sensors 18 to 20 corresponding to the variation of the crank angle are as shown in sections (c) to (e) of FIG. 4. As shown in sections (c) to (e) of FIG. 2, each of the signals output by the first to third rotation sensors 18 to 20 repeats rising edges and falling edges every 90° of crank angle. The signals are displaced by 60° of crank angle from one another. This is because the rotation sensors 18 to 20 are arranged about the motor rotor 17 at equal intervals. Accordingly, the rising edges and falling edges of the signals occur at different timings per each rotation sensor, and more specifically, at relatively short intervals of 30° of crank angle. Therefore, the output patterns of the signals from the rotation sensors 18 to 20 during forward rotation of the engine 1 show patterns in which the rising edges and the falling edges of the signals occur at different timings, in other words, patterns in which the rising edges and the falling edges occur at relatively short intervals of 30° of crank angle.

The theoretical rising and falling points in time of the signals from the rotation sensors 18 to 20 during forward rotation of the engine 1 are determined based on the crank signal. That is, in the case of the preferred embodiment, the rising edges and the falling edges occur at 0°, 30°, 60°, and so on, that is, every time the crank angle advances 30°. These points in time are determined as the theoretical rising and falling points. During forward rotation of the engine 1, the actual rising edges and falling edges of the signals occur at these theoretical points.

Reverse rotation of the engine 1 will now be considered with reference to a case where reverse rotation of the engine 1 is started at, for example, 315° of the crank angle.

If the engine 1 is rotated in reverse when the crank angle becomes 315° during forward rotation of the engine 1, the output pattern of the crank signal and the output patterns of signals from the rotation sensors 18 to 20 thereafter show patterns obtained by flipping the output patterns before the crank angle 315° relative to a broken line L1 in FIG. 2.

Since the crank signal is output at equal intervals (every 10° of crank angle) during forward rotation, even if the output pattern of the crank signal is flipped relative to the broken line L1 due to reverse rotation, the output pattern hardly changes from that during forward rotation. Therefore, the current crank angle is determined based on the crank signal in the same manner as during forward rotation even after reverse rotation, and the points in time where the determined crank angle becomes 0° CA, 30° CA, 60° CA and so on are determined to be corresponding to the theoretical rising and falling points in time of the signals from the rotation sensors 18 to 20.

Figure 5:
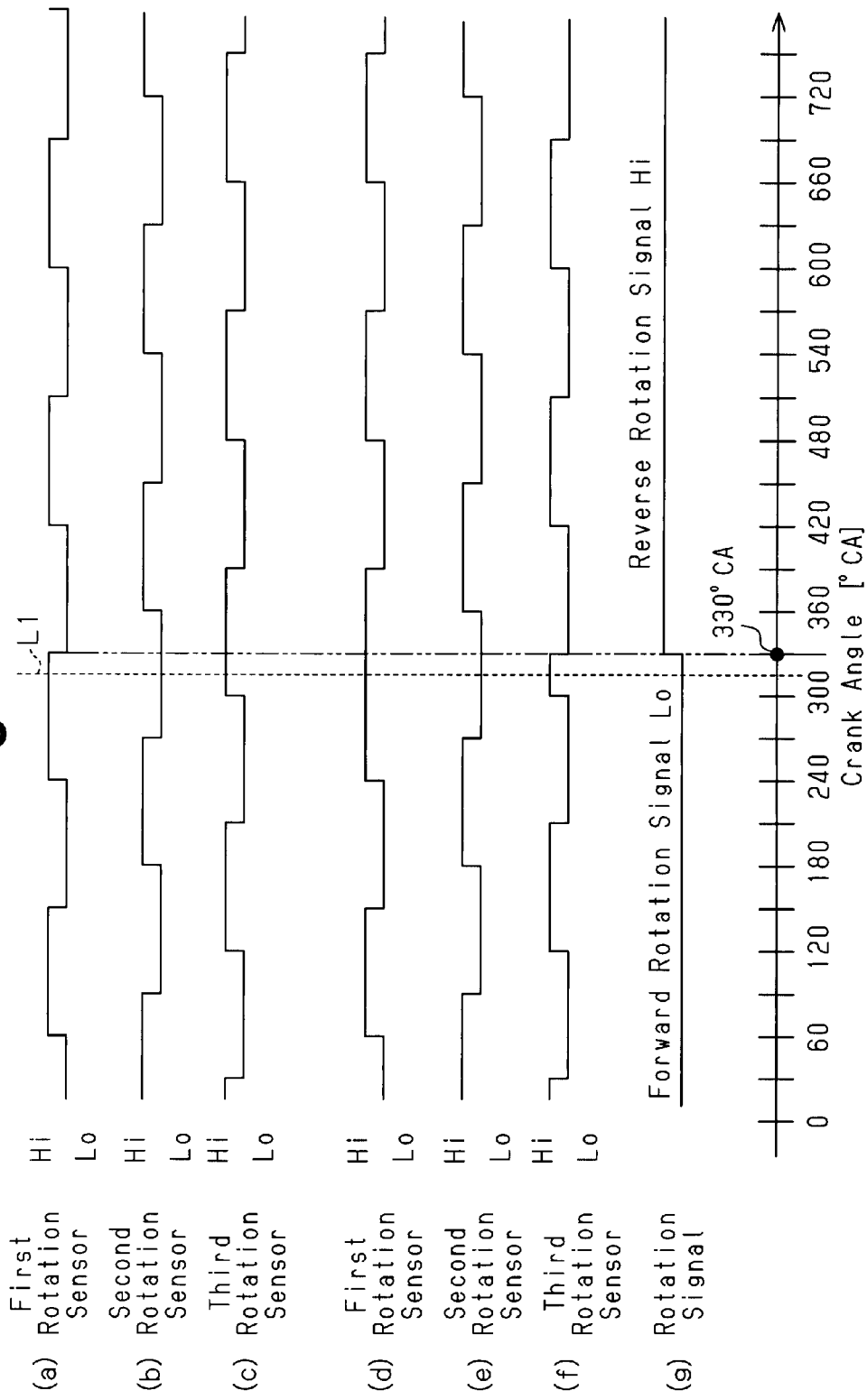
FIG. 5 is a timing chart showing the waveforms of various signals, in which sections (a) to (c) show the waveforms of signals from the first to third rotation sensors during the forward rotation of the engine, sections (d) to (f) show the waveforms of signals from the first to third rotation sensors during negative rotation of the engine, and section (g) shows the waveform of a forward/reverse rotation signal from a motor driver.

Meanwhile, the output patterns of the signals from the rotation sensors 18 to 20 change as shown in the timing chart of FIG. 5 as forward rotation shifts to reverse rotation. Sections (a) to (c) of FIG. 5 show the output patterns of signals from the first to third rotation sensors 18 to 20 during forward rotation. When the engine 1 rotates in reverse at 315° of crank angle, the signal output patterns thereafter show the output patterns as shown in sections (d) to (f) of FIG. 5 due to reverse rotation of the motor rotor 17, that is, the output patterns obtained by flipping the output patterns before 315° of crank angle relative to broken line L1 in FIG. 3.

In the preferred embodiment, when the output patterns of the signals from the first to third rotation sensors 18 to 20 become different from the those during forward rotation due to reverse rotation of the engine 1, reverse rotation of the engine 1 is detected accordingly.

The rising edges and the falling edges of the signals occur at relatively short intervals of 30° of crank angle during forward rotation of the engine 1. Therefore, when the engine 1 rotates in reverse, the rising and falling timings of the signals become different from those during forward rotation, that is, the output patterns of the signals are promptly changed. Therefore, based on the change of the output patterns, the occurrence of reverse rotation is promptly detected.

Figure 6:
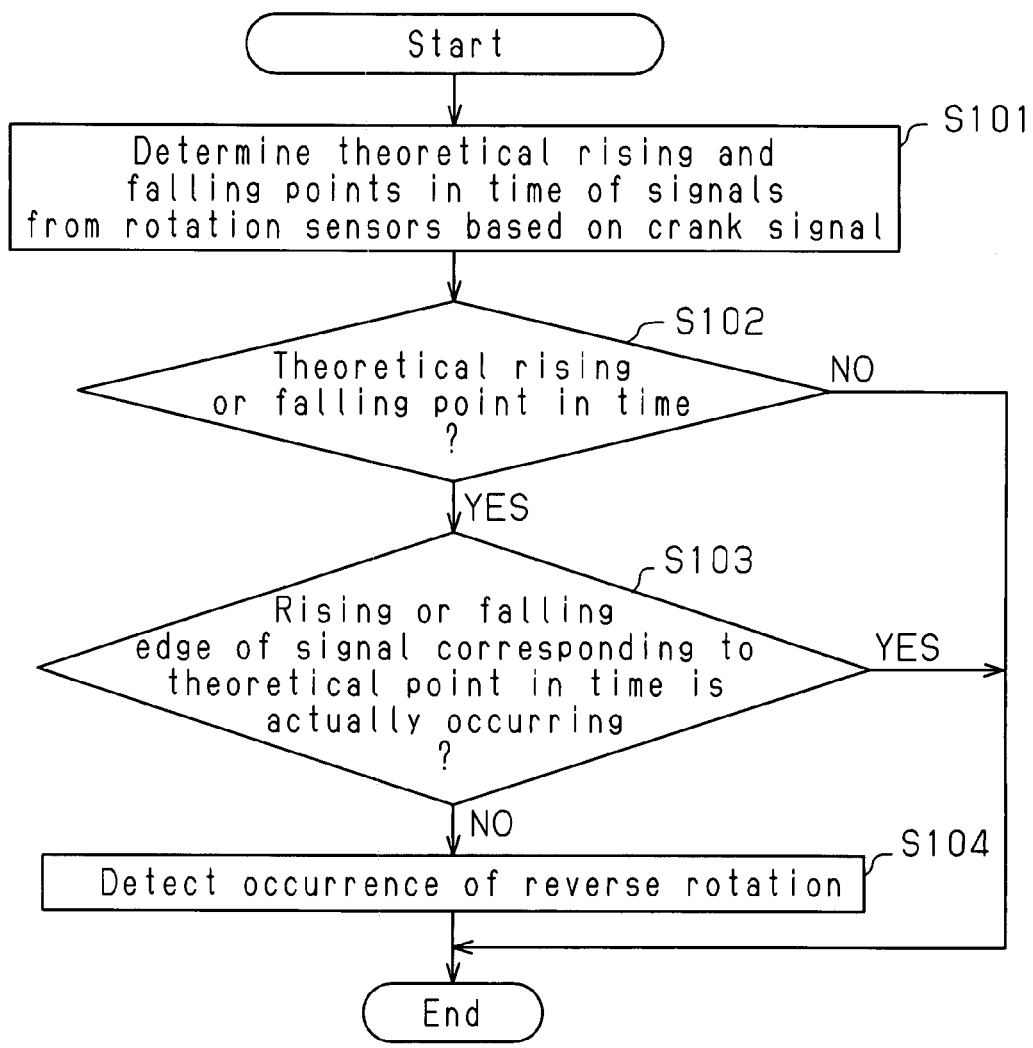
FIG. 6 is a flowchart showing a procedure for detecting the occurrence of reverse rotation of the engine.

More specifically, reverse rotation is detected based on the variation of the output patterns as follows in accordance with the procedure shown in the flowchart of FIG. 6.

That is, as described above, during either forward rotation or reverse rotation of the engine 1, the crank angle is determined based on the crank signal, and the points in time when the crank angle becomes 0° CA, 30° CA, 60° CA and so on are determined as the theoretical rising and falling points in time of the signals from the rotation sensors 18 to 20 (S101).

When, for example, reverse rotation of the engine 1 occurs at 315° of crank angle, the point in time where the crank angle determined based on the crank signal becomes 330° is determined to correspond to the theoretical rising or falling point in time of the signal from any of the rotation sensors 18 to 20. During forward rotation of the engine, when the time (330° CA) determined as described above comes, the rising edge or the falling edge of the corresponding signal (in this case, the falling edge of the signal from the first rotation sensor 18 (see section (a) of FIG. 5)) actually occurs. However, when the engine 1 rotates in reverse, the output patterns of the signals from the rotation sensors 18 to 20 change from the state during forward rotation. Therefore, even if the time (330° CA) comes, the rising edge or the falling edge of the corresponding signal does not occur (see section (d) of FIG. 5).

The existence of such phenomenon is determined based on, when the time comes, that is, when the decision outcome of step S102 is positive, whether the rising edge or the falling edge of the corresponding signal actually occurs (S103). That is, if the rising edge or the falling edge of the corresponding signal does not actually occur at this point in time, that is, when the decision outcome of step S103 is negative, the above mentioned phenomenon is occurring. When this phenomenon occurs, the occurrence of reverse rotation of the engine 1 is detected (S104).

The above described detection of reverse rotation using the output patterns of the signals from the rotation sensors 18 to 20 is performed by the motor driver 12. When the occurrence of reverse rotation of the engine 1 is detected, a reverse rotation signal "Hi" is output from the motor driver 12 to the engine control computer 11 as shown in section (g) of FIG. 5. Also, when the occurrence of reverse rotation of the engine 1 is not detected, a forward rotation signal "Lo" is output from the motor driver 12 to the engine control computer 11.

Figure 7:
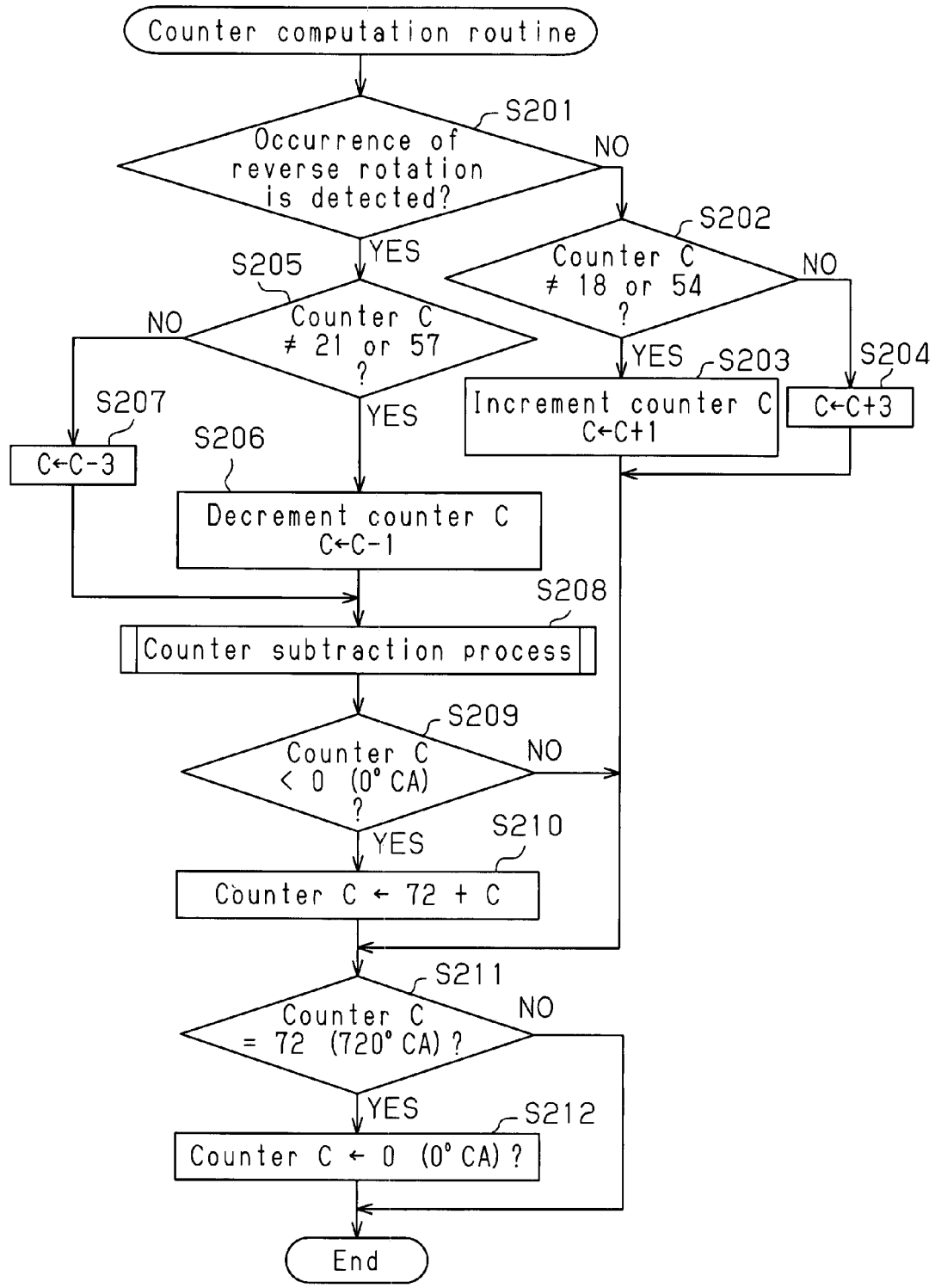
FIG. 7 is a flowchart showing a procedure for computing a counter.

The countermeasure against a discrepancy between the counter C and the actual crank angle created after the occurrence of reverse rotation of the engine 1 will now be described with reference to the flowchart of FIG. 7, which shows a counter computation routine. The counter computation routine is executed as an interrupt by the engine control computer 11, for example, at every output of the crank signal.

In this routine, addition and subtraction of the counter C for acquiring the crank angle are executed. Every time addition or subtraction of the counter C is performed through the execution of the routine, the engine control computer 11 stores the value of the counter C in a nonvolatile RAM. When the engine 1 is started after being stopped, the engine control computer 11 sets the counter value stored in the nonvolatile RAM as the initial value of the counter C. Accordingly, when the operation of the engine 1 ends, the value of the counter C at the time of the stop of the crankshaft 6 is stored. Next time the starting of the engine 1 is initiated, addition to the counter C is started by setting the stored counter value as the initial value.

Based on whether the reverse rotation signal "Hi" is output from the motor driver 12, the engine control computer 11 determines whether the occurrence of reverse rotation of the engine 1 is detected (S201).

If the decision outcome is negative, that is, if it is determined that reverse rotation has not occurred, a process of addition to the counter C used for acquiring the crank angle (S202 to S204) is executed. That is, at step S202, whether the counter C has a value other than 18 and 54 is determined. If the decision outcome is positive, the crank signal is being output based on the projections 13a during forward rotation of the engine 1. In this case, the engine control computer 11 proceeds to step S203 and increments the counter C by 1. If the decision outcome at step S202 is negative, the crank signal is being output based on the tooth missing portion 13b during forward rotation of the engine 1. In this case, the engine control computer 11 proceeds to step S204 and increments the counter C by 3. In the above described increment process, the counter C is returned to 0 at step S212 when reaching 72 (720° CA), or when the decision outcome at step S211 is positive.

On the other hand, if the decision outcome at step S201 is positive, or if it is determined that the occurrence of reverse rotation has been detected, steps S205 to S208 are executed as a countermeasure against a discrepancy between the counter C and the actual crank angle after the occurrence of reverse rotation. That is, at step S205, whether the counter C has a value other than 21 and 57 is determined. If the decision outcome is positive, the crank signal is being output based on the projections 13a during reverse rotation of the engine 1. In this case, the engine control computer 11 proceeds to step S206 and decrements the counter C by 1. If the decision outcome at step S205 is negative, the crank signal is being output based on the tooth missing portion 13b during reverse rotation of the engine 1. In this case, the engine control computer 11 proceeds to step S207 and decrements the counter C by 3. This is because a single output of the crank signal corresponding to the tooth missing portion 13b corresponds to three outputs of the crank signal corresponding to the projections 13a.

In this manner, after reverse rotation of the engine 1 is detected, the counter C is decremented by 1 every time the crank advances angle by 10°. Thus, after the occurrence of reverse rotation is detected, the counter C is reduced at every output of the crank signal in correspondence with the actual crank angle, which is reduced at every output of the crank signal.

However, there is a time lag between the actual occurrence of reverse rotation and the detection of the reverse rotation. This delays the start of decrement of the counter C. For example, in the example of FIG. 5, if reverse rotation occurs at 315° CA, the reverse rotation is detected at 330° CA. The period between 315° CA and 330° CA corresponds to the time lag. During this period, the counter C is incremented despite the reverse rotation. The counter C is therefore inevitably displaced from the actual crank angle. The discrepancy remains until the crankshaft 6 stops. It is therefore difficult to match the counter C when the crankshaft 6 stops with the actual crank angle.

Then, the counter value of the counter C that does not correspond to the actual crank angle at the time of stopping of the crankshaft 6 is stored and used as the initial value of the counter C in the subsequent starting of the engine 1. Accordingly, the crank angle acquired based on the counter C after initiating the starting of the engine 1 will have an erroneous value. As a result, the first fuel injection and ignition after initiating the starting of the engine 1 cannot be executed at an appropriate time (crank angle). The starting performance of the engine 1 therefore cannot be improved.

In the present embodiment, a counter subtraction process of step S208 (FIG. 7) is executed for eliminate such a problem. Specifically, at step S208, a subtraction value Y is computed, which corresponds to a discrepancy between the counter C and the actual crank angle due to a time lag (difference in time) between the actual occurrence of reverse rotation in the engine 1 and the detection of the reverse rotation. Then, the counter C is reduced by the subtraction value Y. Through the counter subtraction process, the discrepancy between the counter C and the actual crank angle due to the time lag is eliminated, so that the counter C corresponds to the actual crank angle. Accordingly, even if reverse rotation occurs during the stopping process of the engine 1, the counter C when the crankshaft 6 stops reliably corresponds to the actual crank angle. Therefore, when the starting of the engine 1 is initiated, the crank angle acquired based on the counter C will be accurate. This permits the first fuel injection and ignition to be performed at an appropriate time (crank angle) at an early stage after the engine starting is initiated. This improves the starting performance of the engine 1.

After the subtraction of the counter C as describe above is performed at steps S205 to S208, if the value of the counter C is less than 0 (YES at S209), the value of the counter C is converted into a positive value through the expression C←72+C (S210).

The counter subtraction process (S208) will now be described.

The subtraction value Y used in the counter subtraction process is obtained in the following manner. That is, a determination period is set based on the signal from one of the rotation sensors 18 to 20 that has had a theoretical rising point in time or a theoretical falling point in time of the signal most immediately before the occurrence of reverse rotation is detected, and the subtraction value Y is computed based on the number of outputs X of the crank signal during the determination period. The determination period is a period from a theoretical rising point in time or a theoretical falling point in time of the signal from the rotation sensor most immediately before the detection of the occurrence of reverse rotation to when the signal actually rises or falls.

The determination of whether reverse rotation has occurred in the engine 1 is performed at every theoretical rising and falling point in time of the signals from the sensors 18 to 20, that is, at every 30° of crank angle, specifically at 0° CA, 30° CA, 60° CA and so on. In the signal from each of the rotation sensors 18 to 20, the output pattern after the occurrence of reverse rotation is obtained by flipping the output pattern before the occurrence relative to the point in time of the occurrence. Therefore, regarding a rotation sensor that has had a theoretical rising point in time or a theoretical falling point in time of the signal most immediately before the occurrence of reverse rotation is detected, a rising edge or a falling edge of the signal occurs immediately after the occurrence of reverse direction. The determination period, that is, a period from a theoretical rising point in time or a theoretical falling point in time of the signal from the rotation sensor immediately before the occurrence of reverse rotation to when the signal actually rises or falls after the occurrence of the reverse rotation has the following characteristics. That is, the closer the time at which reverse rotation occurs to the next theoretical rising point in time or falling point in time of the signal, the longer the determination period becomes. In other words, the closer the time at which reverse rotation occurs to the point in time at which the occurrence of reverse rotation is determined next time, the longer the determination period becomes. The longer the determination period, the more increased the number of outputs of the crank signal in the determination period becomes.

Therefore, the less the number of outputs X of the crank signal, the longer the period from the actual occurrence of reverse rotation to the detection of the occurrence becomes. Also, the period in which the counter C is incremented despite the occurrence of reverse rotation is extended. This increases the discrepancy between the counter C and the actual crank angle. In contrast, the more the number of outputs X of the crank signal, the shorter the period from the actual occurrence of reverse rotation to the detection of the occurrence becomes. Also, the period in which the counter C is incremented despite the occurrence of reverse rotation is shortened. This reduces the discrepancy between the counter C and the actual crank angle.

The subtraction value Y, which is used for subtraction of the counter C for eliminating the discrepancy between the counter C and the actual crank angle, is computed based on the number of outputs X of the crank signal that is a parameter related to the magnitude of the discrepancy. Therefore, by reducing the counter C by the subtraction value Y, the discrepancy between the counter C and the actual crank angle is appropriately eliminated, so that the counter C when the crankshaft 6 stops accurately corresponds to the actual crank angle.

The subtraction value Y, which eliminates the discrepancy, is influenced by the position of the tooth missing portion 13*b* in relation to the crank position sensor 14 when reverse rotation occurs. Accordingly, the computation of the subtraction value Y is performed in three different manners according to the cases [1] to [3] shown below.

[1] The case where reverse rotation occurs when the crank signal is output corresponding to the projection 13*a* farthest from the tooth missing portion 13*b*.

[2] The case where reverse rotation occurs when the crank signal is output corresponding to the tooth missing portion 13*b*.

[3] The case where reverse rotation occurs when the crank signal is output corresponding to the projection 13*a* located immediately after the tooth missing portion 13*b*.

Figure 21:
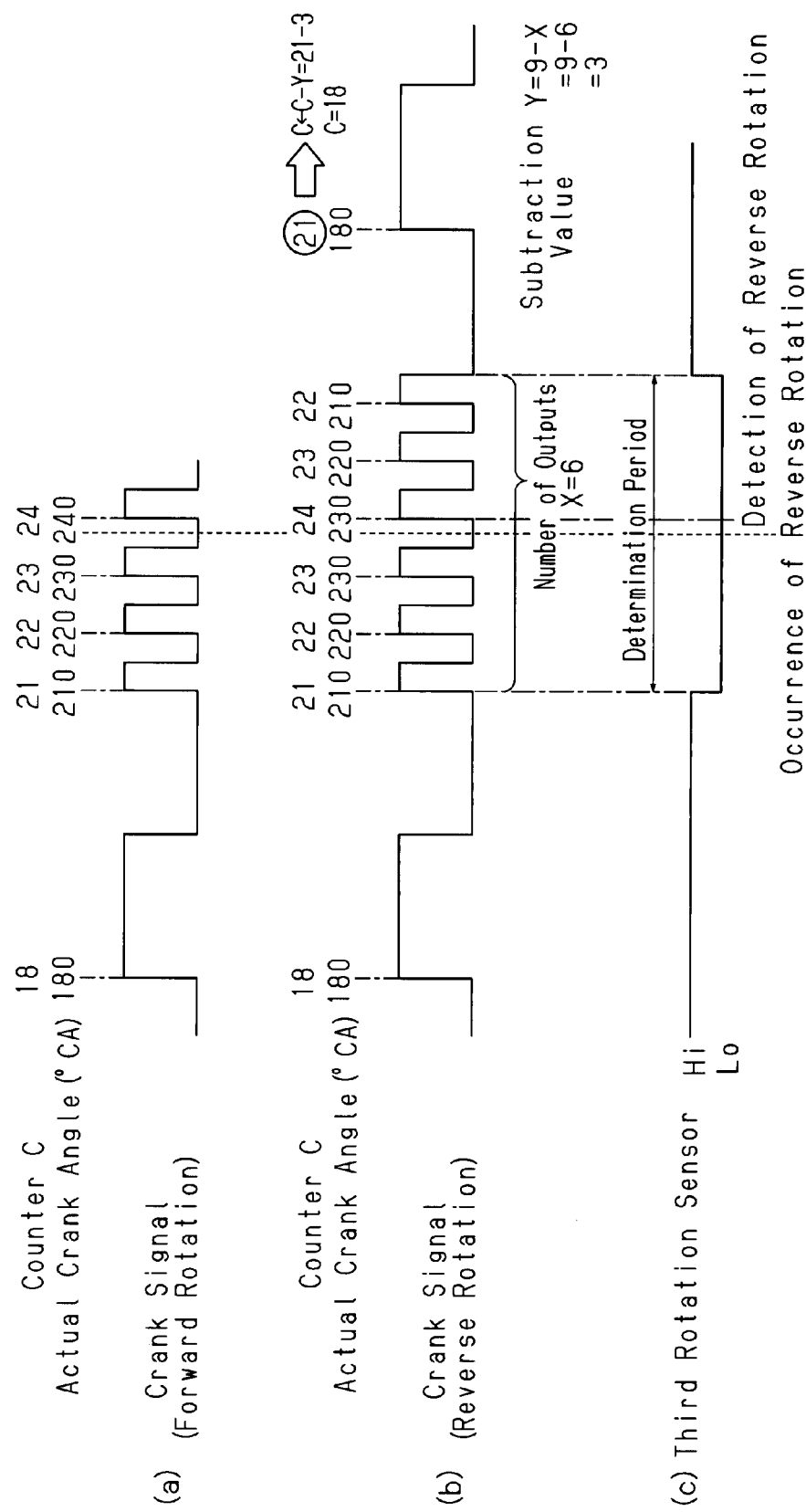
FIG. 21 is a waveform diagram showing output patterns, in which section (a) shows the output pattern of the crank signal during the forward rotation, section (b) shows the output pattern of the crank signal when reverse rotation occurs in a range between 235° CA and 240° CA, and section (c) shows the output pattern of a signal from the third rotation sensor at the time of the occurrence of reverse direction.

The procedures for computing the subtraction value Y in each of the cases [1] to [3] will now be described with reference to FIGS. 8 and 21.

Figure 14:
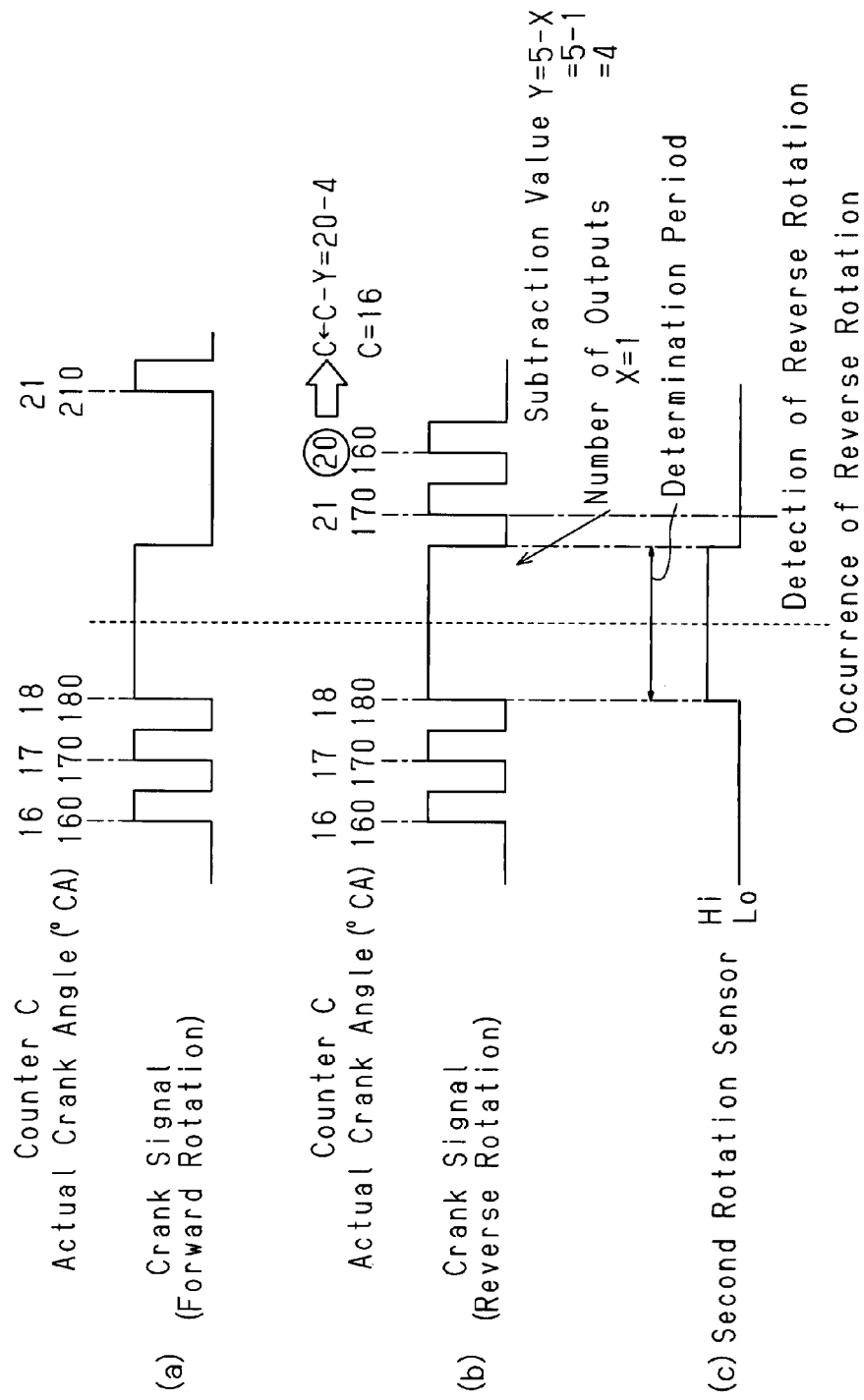
FIG. 14 is a waveform diagram showing output patterns, in which section (a) shows the output pattern of the crank signal during the forward rotation, section (b) shows the output pattern of the crank signal when reverse rotation occurs in a range between 180° CA and 195° CA, and section (c) shows the output pattern of a signal from the third rotation sensor at the time of the occurrence of reverse direction.
Figure 15:
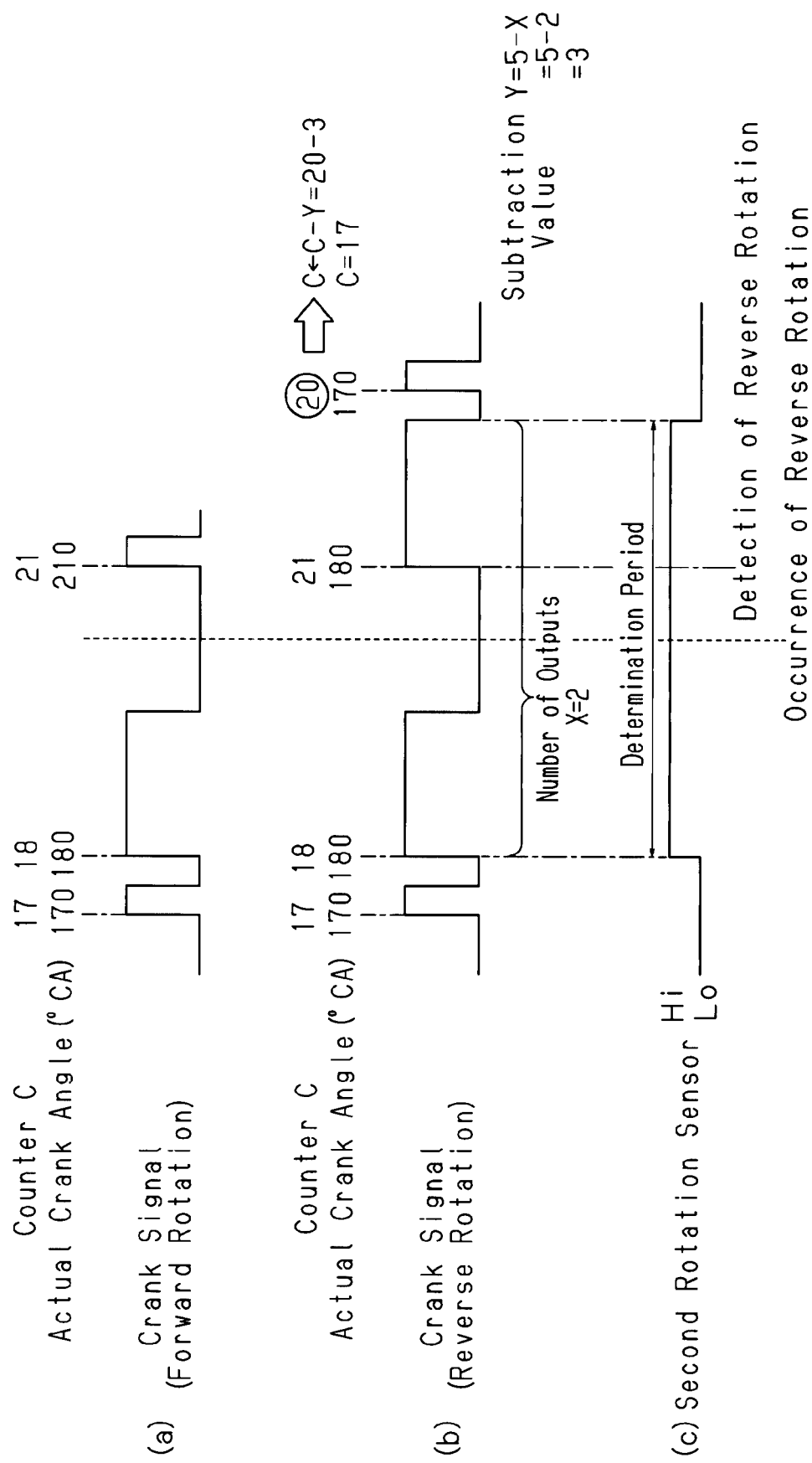
FIG. 15 is a waveform diagram showing output patterns, in which section (a) shows the output pattern of the crank signal during the forward rotation, section (b) shows the output pattern of the crank signal when reverse rotation occurs in a range between 195° CA and 210° CA, and section (c) shows the output pattern of a signal from the third rotation sensor at the time of the occurrence of reverse direction.

FIGS. 8 to 13 correspond to the case [1], FIGS. 14 and 15 correspond to the case [2], and FIGS. 16 to 21 correspond to the case [3]. In each of FIGS. 8 to 21, section (a) shows the output pattern of the crank signal during forward rotation of the engine 1, and section (b) shows the output pattern of the crank signal when reverse rotation of the engine 1 occurs at the point in time represented by broken line. Section (c) in each of FIGS. 8 to 21 shows the output pattern of the signal from the rotation sensor, which signal has a theoretical rising point in time or a theoretical falling point in time immediately before the detection of reverse rotation. The procedure for computing the subtraction value Y in each of the cases [1] to [3] will now be described.

Computation of Subtraction Value Y in Case [1]

Case [1] occurs, for example, when reverse rotation occurs during a period from 300° to 330° of crank angle. In this period, the signal from the third rotation sensor 20 has a theoretical rising point in time at 300° CA, and a theoretical falling point in time at 330° CA. The period from the actual occurrence of reverse rotation to the detection of the reverse rotation, in other words, the number of outputs of the crank signal during the period varies depending on which point in the period from 300° CA to 330° CA the reverse rotation occurs at.

Figure 8:
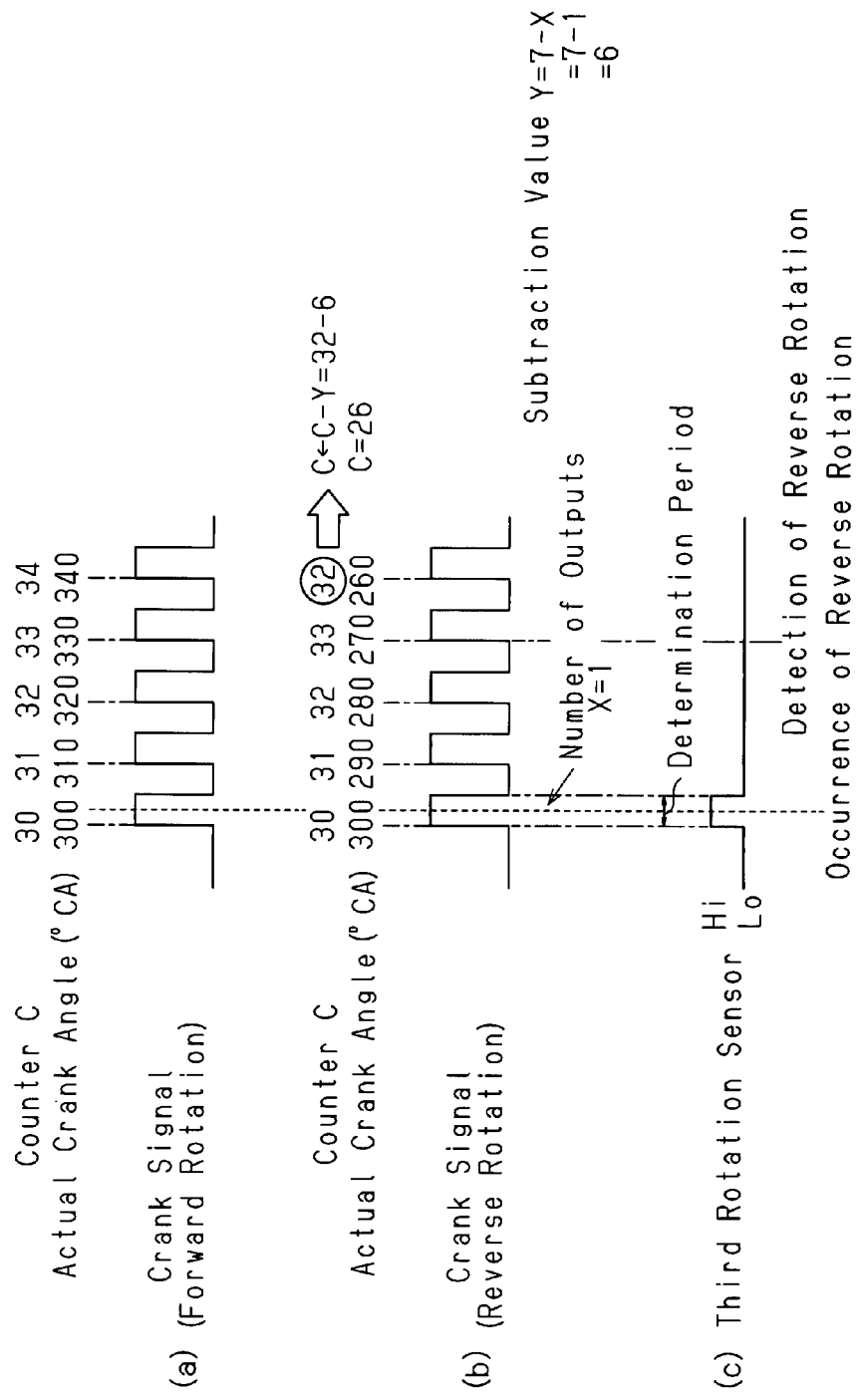
FIG. 8 is a waveform diagram showing output patterns, in which section (a) shows the output pattern of the crank signal during the forward rotation, section (b) shows the output pattern of the crank signal when reverse rotation occurs in a range between 300° CA and 305° CA, and section (c) shows the output pattern of a signal from the third rotation sensor at the time of the occurrence of reverse direction.
Figure 9:
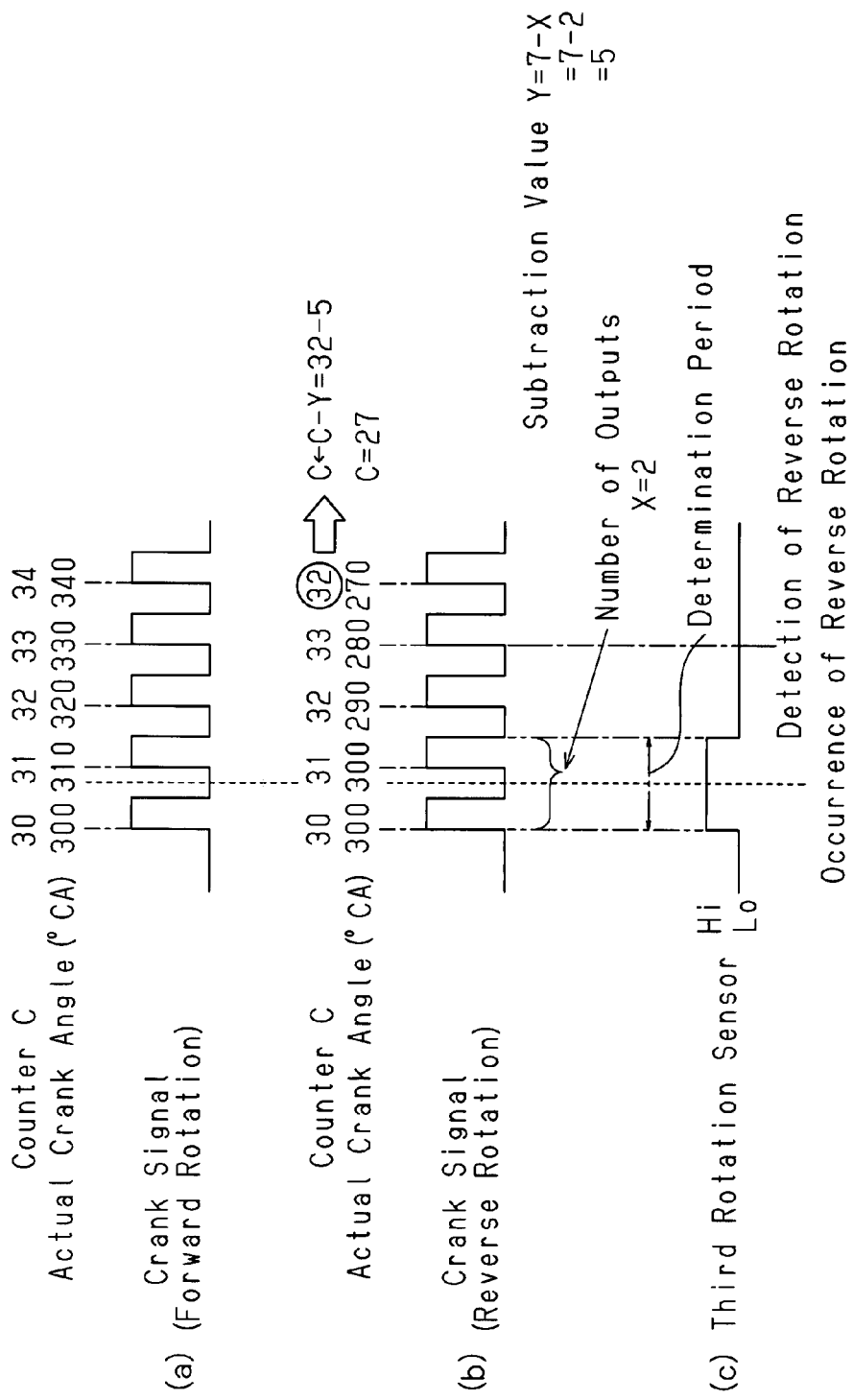
FIG. 9 is a waveform diagram showing output patterns, in which section (a) shows the output pattern of the crank signal during the forward rotation, section (b) shows the output pattern of the crank signal when reverse rotation occurs in a range between 305° CA and 310° CA, and section (c) shows the output pattern of a signal from the third rotation sensor at the time of the occurrence of reverse direction.
Figure 10:
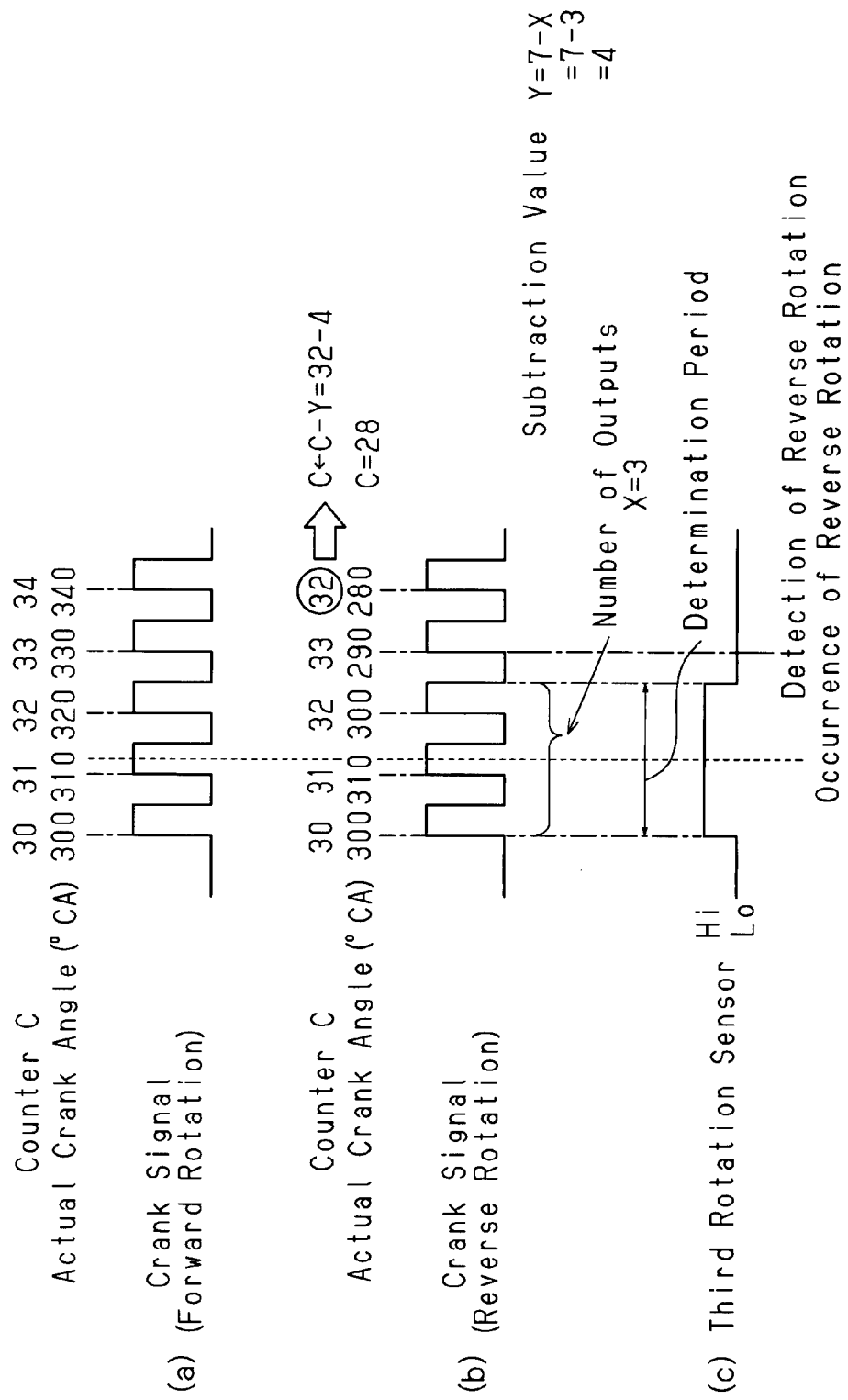
FIG. 10 is a waveform diagram showing output patterns, in which section (a) shows the output pattern of the crank signal during the forward rotation, section (b) shows the output pattern of the crank signal when reverse rotation occurs in a range between 310° CA and 315° CA, and section (c) shows the output pattern of a signal from the third rotation sensor at the time of the occurrence of reverse direction.
Figure 11:
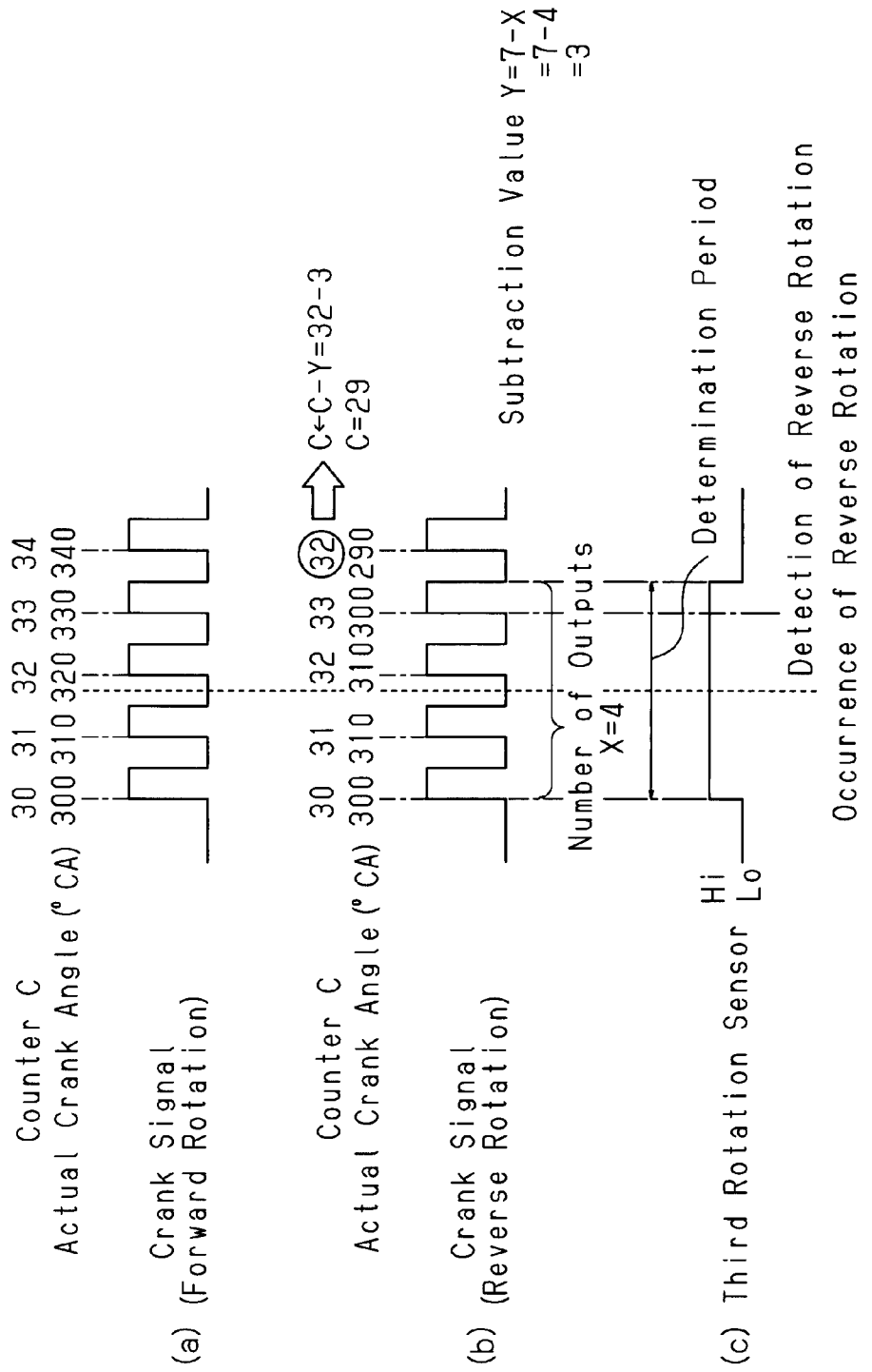
FIG. 11 is a waveform diagram showing output patterns, in which section (a) shows the output pattern of the crank signal during the forward rotation, section (b) shows the output pattern of the crank signal when reverse rotation occurs in a range between 315° CA and 320° CA, and section (c) shows the output pattern of a signal from the third rotation sensor at the time of the occurrence of reverse direction.
Figure 12:
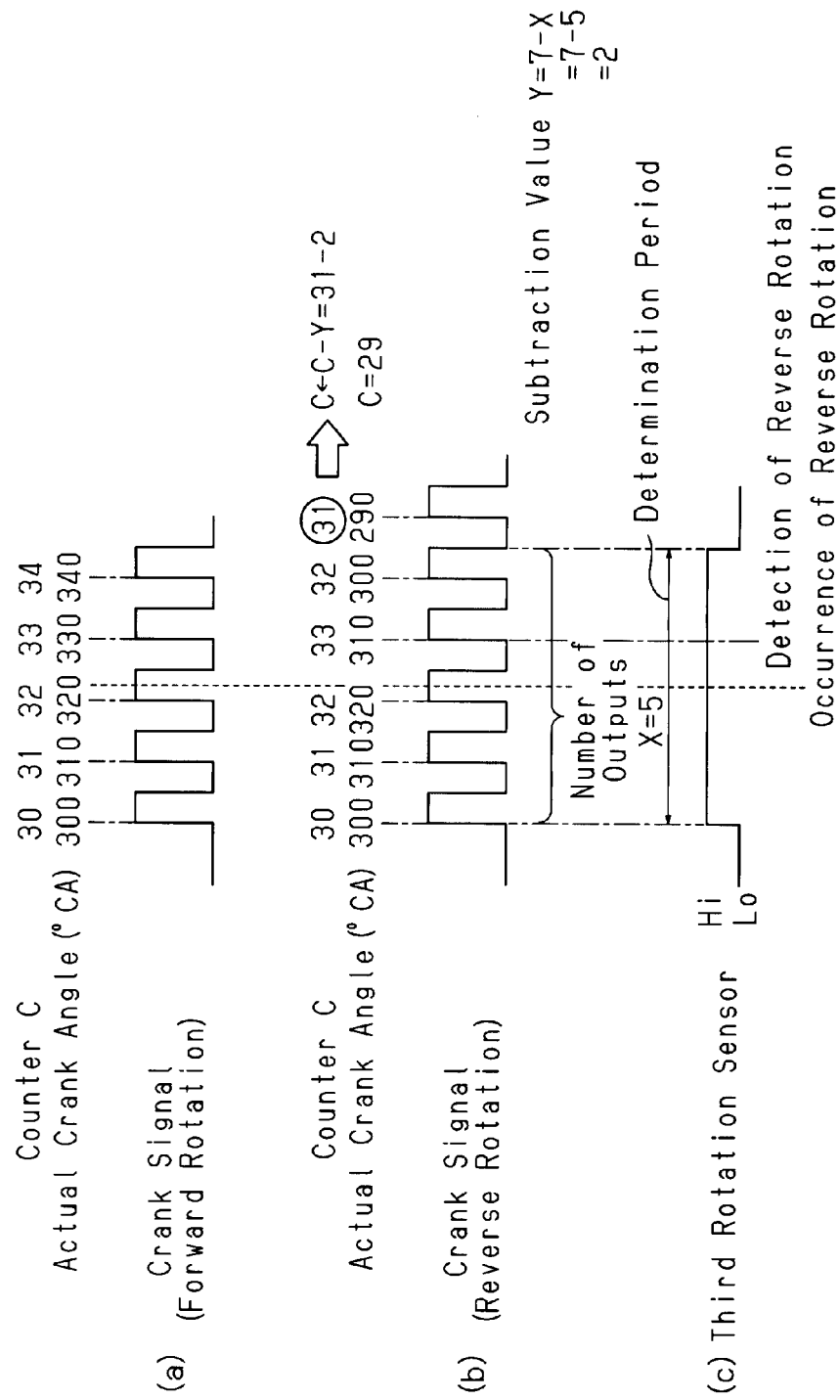
FIG. 12 is a waveform diagram showing output patterns, in which section (a) shows the output pattern of the crank signal during the forward rotation, section (b) shows the output pattern of the crank signal when reverse rotation occurs in a range between 320° CA and 325° CA, and section (c) shows the output pattern of a signal from the third rotation sensor at the time of the occurrence of reverse direction.
Figure 13:
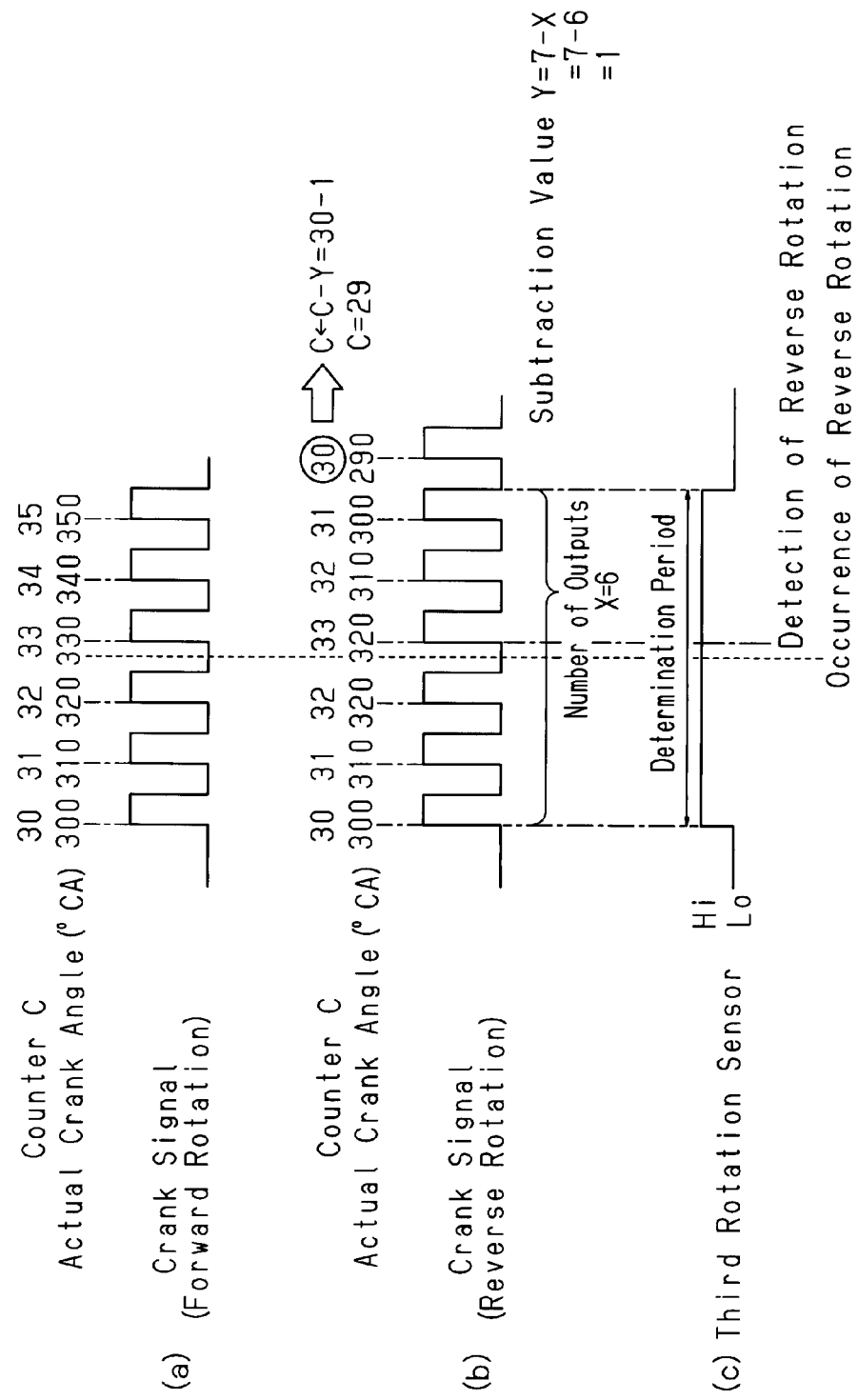
FIG. 13 is a waveform diagram showing output patterns, in which section (a) shows the output pattern of the crank signal during the forward rotation, section (b) shows the output pattern of the crank signal when reverse rotation occurs in a range between 325° CA and 330° CA, and section (c) shows the output pattern of a signal from the third rotation sensor at the time of the occurrence of reverse direction.

If reverse rotation occurs in the period corresponding to the crank angle between 300° and 305° (FIG. 8), the output pattern of the crank signal after the occurrence of reverse rotation will be an output pattern that is obtained by flipping the output pattern before the occurrence of the reverse rotation relative to broken line shown in section (b) of FIG. 8. The signal from the third rotation sensor 20 has a rising edge at 300° CA, which is immediately before the occurrence of reverse rotation. The output pattern of the signal from the third rotation sensor 20 after the occurrence of reverse rotation is also obtained by flipping the output pattern before the occurrence of the reverse rotation relative to the broken line. Therefore, the signal from the third rotation sensor 20 has a falling edge immediately after the occurrence of reverse rotation.

As described above, when reverse rotation occurs, until the point in time where the occurrence of reverse rotation is determined next time (time at which C=33), the actual crank angle is reduced in the order 290°, 280°, 270° at every output of the crank signal after the occurrence of reverse rotation, while the counter C is increased in the order 31, 32, 33 at every output of the crank signal. When the counter C reaches 33, the occurrence of reverse rotation is detected. Thereafter, the counter C is decremented at every output of the crank signal. Therefore, at the first output of the crank signal after the occurrence of reverse rotation is detected, the counter C is decremented from 33 by 1 and becomes 32. However, since the actual crank angle is 260° in this state, the counter C should have 26 that corresponds to 260° CA. The value of the counter C is therefore displaced by 6 from the proper value.

Such a discrepancy between the counter C and the actual crank angle is caused by a time lag between the actual occurrence of reverse rotation and the detection of the reverse rotation. The discrepancy thus increases as the time lag increases. The time lag corresponds to the period from the theoretical rising point in time (300° CA) of the signal from the third rotation sensor 20 immediately before the occurrence of reverse rotation to the next falling edge of the signal (the determination period). The time lag increases as the determination period becomes shorter. The length of the determination period is extended as the number of outputs X of the crank signal during the determination period increases. Therefore, the number of outputs X is a parameter corresponding to the discrepancy between the counter C and the actual crank angle. In this case, the number of outputs X is 1.

Based on the number of outputs X, the subtraction value Y that corresponds to the discrepancy between the counter C and the actual crank angle is computed. In this case, the subtraction value Y is 6. Specifically, the subtraction value Y is computed based on the expression $Y=7-X$, in which 1 is used as the number of outputs X. Thus computed subtraction value Y is 6. The counter C is decremented by the subtraction value Y and becomes 26. The discrepancy between the counter C and the actual crank angle (260° CA) is thus eliminated, so that the counter C corresponds to the actual crank angle.

FIGS. 9 to 13 show the output patterns of the crank signal (sections (b)) and the output patterns of the third rotation sensor 20 (sections (c)) in the cases where the occurrence of reverse rotation (broken line) is in the period between 305° and 310°, the period between 310° and 315°, the period between 315° and 320°, the period between 320° and 325°, and the period between 325° and 330°.

As shown in the diagrams, the time lag between the actual occurrence of reverse rotation and the detection of the reverse rotation is extended as the point in time of the occurrence approaches the next actual falling point in time of the signal from the third rotation sensor 20. Accordingly, as the occurrence of reverse rotation approaches the point in time at which C=33, the determination period is extended, and the number of outputs X increases. Specifically, the number of outputs X increases in the order 2, 3, 4, 5, 6 as the point in time at which reverse rotation occurs changes in the order as follows: a point in the period from 305° to 310°, a point in the period from 310° to 315°, a point in the period from 315° to 320°, a point in the period from 320° to 325°, and a point the period from 325° to 330°. Based on the expression $Y=7-X$, in which the number of outputs X is used, the subtraction value Y is computed. The subtraction value Y is subtracted from the counter C immediately after the end of the determination period. Accordingly, as in the case where reverse rotation occurs in the period from 300° to 305°, the discrepancy between the counter C and the actual crank angle is eliminated, so that the counter C corresponds to the actual crank angle.

Computation of Subtraction Value Y in Case [2]

Case [2] occurs, for example, when reverse rotation occurs during a period from 180° to 210° of crank angle. In this period, the signal from the second rotation sensor 19 has a theoretical rising point in time at 180° CA, and a theoretical falling point in time at 210° CA. The period from the actual occurrence of reverse rotation to the detection of the reverse rotation, in other words, the number of outputs of the crank signal during the period varies depending on which point in the period from 180° CA to 210° CA the reverse rotation occurs at.

If reverse rotation occurs in the period corresponding to the crank angle between 180° and 195° (FIG. 14), the output pattern of the crank signal after the occurrence of reverse rotation will be an output pattern that is obtained by flipping the output pattern before the occurrence of the reverse rotation relative to broken line shown in section (b) of FIG. 14. The signal from the second rotation sensor 19 has a rising edge at 180° CA, which is immediately before the occurrence of reverse rotation. The output pattern of the signal from the second rotation sensor 19 after the occurrence of reverse rotation is also obtained by flipping the output pattern before the occurrence of the reverse rotation relative to the broken line. Therefore, the signal from the second rotation sensor 19 has a falling edge immediately after the occurrence of reverse rotation.

When reverse rotation occurs as described above, the engine 1 rotates in reverse with the counter C being 18. Thereafter, although the first output of the crank signal corresponds to the projection 13a, the first output of the crank signal is regarded as corresponding to the tooth missing portion 13b, and 3 is added to the counter C. At this time, although the actual crank angle diminishes from 180° to 170° in accordance with the reverse rotation, the counter C increases from 18 to 21. When the counter C reaches 21, whether reverse rotation has occurred is determined, and reverse rotation of the engine 1 is detected. Thereafter, the counter C is decremented at every output of the crank signal. Therefore, at the first output of the crank signal after the occurrence of reverse rotation is detected, the counter C is decremented from 21 by 1 and becomes 20. However, since the actual crank angle has changed from 170° to 160°, the counter C should have 16 that corresponds to 160° CA. The value of the counter C is therefore displaced by 4 from the proper value.

Such a discrepancy between the counter C and the actual crank angle is caused by a time lag between the actual occurrence of reverse rotation and the detection of the reverse rotation. The discrepancy thus increases as the time lag increases. The time lag corresponds to the period from the theoretical rising point in time (180° CA) of the signal from the second rotation sensor 19 immediately before the occurrence of reverse rotation to the next falling edge of the signal (the determination period). The time lag increases as the determination period becomes shorter. The length of the determination period is extended as the number of outputs X of the crank signal during the determination period increases. Therefore, the number of outputs X is a parameter corresponding to the discrepancy between the counter C and the actual crank angle. In this case, the number of outputs X is 1.

Based on the number of outputs X, the subtraction value Y that corresponds to the discrepancy between the counter C and the actual crank angle is computed. In this case, the subtraction value Y is 4. Specifically, the subtraction value Y is computed based on the expression Y=5−X, in which 1 is used as the number of outputs X. Thus computed subtraction value Y is 4. The counter C is decremented by the subtraction value Y and becomes 16. The discrepancy between the counter C and the actual crank angle (160° CA) is thus eliminated, so that the counter C corresponds to the actual crank angle.

FIG. 15 shows the output pattern of the crank signal (section (b)) and the output pattern of the second rotation sensor 19 (section (c)) in the case where the occurrence of reverse rotation (broken line) is in the period between 195° and 210°.

As shown in the diagrams, the time lag between the actual occurrence of reverse rotation and the detection of the reverse rotation is extended as the point in time of the occurrence approaches the next actual falling point in time of the signal from the second rotation sensor 19. Accordingly, as the occurrence of reverse rotation approaches the point in time at which C=21, the determination period is extended, and the number of outputs X increases. Therefore, when the point in time at which reverse rotation occurs is in the period from 195° to 210°, the number of outputs X is increased to 2. Based on the expression Y=5−X, in which the number of outputs X is used, the subtraction value Y is computed. The subtraction value Y is subtracted from the counter C (20) immediately after the end of the determination period. Accordingly, as in the case where reverse rotation occurs in the period from 180° to 195°, the discrepancy between the counter C and the actual crank angle is eliminated, so that the counter C corresponds to the actual crank angle.

Computation of Subtraction Value Y in Case [3]

Case [3] occurs, for example, when reverse rotation occurs during a period from 210° to 215° of crank angle. In this period, the signal from the third rotation sensor 20 has a theoretical falling point in time at 210° CA, and a theoretical rising point in time at 240° CA. The period from the actual occurrence of reverse rotation to the detection of the reverse rotation, in other words, the number of outputs of the crank signal during the period varies depending on which point in the period from 210° CA to 240° CA the reverse rotation occurs at.

Figure 16:
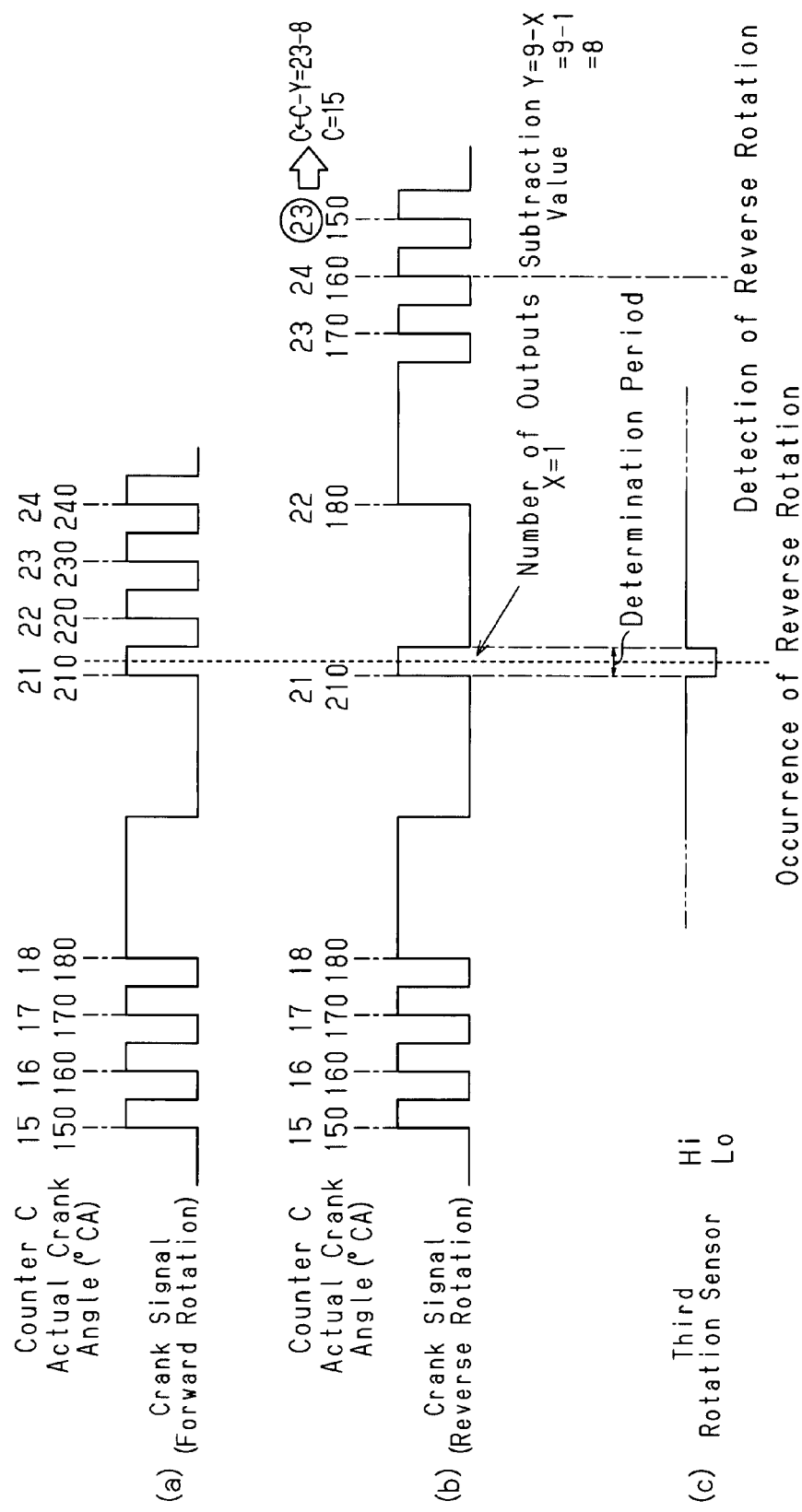
FIG. 16 is a waveform diagram showing output patterns, in which section (a) shows the output pattern of the crank signal during the forward rotation, section (b) shows the output pattern of the crank signal when reverse rotation occurs in a range between 210° CA and 215° CA, and section (c) shows the output pattern of a signal from the third rotation sensor at the time of the occurrence of reverse direction.
Figure 17:
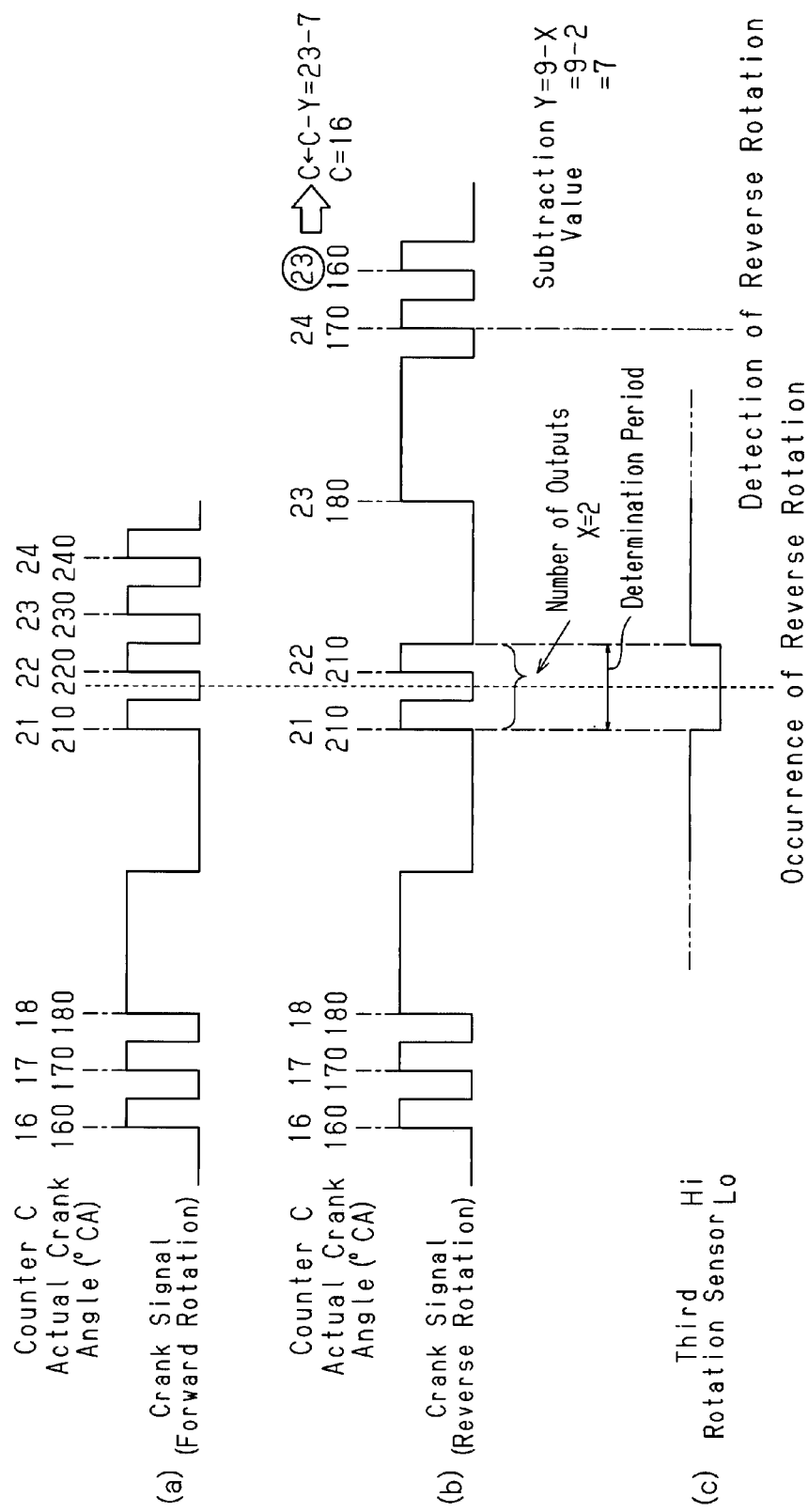
FIG. 17 is a waveform diagram showing output patterns, in which section (a) shows the output pattern of the crank signal during the forward rotation, section (b) shows the output pattern of the crank signal when reverse rotation occurs in a range between 215° CA and 220° CA, and section (c) shows the output pattern of a signal from the third rotation sensor at the time of the occurrence of reverse direction.
Figure 18:
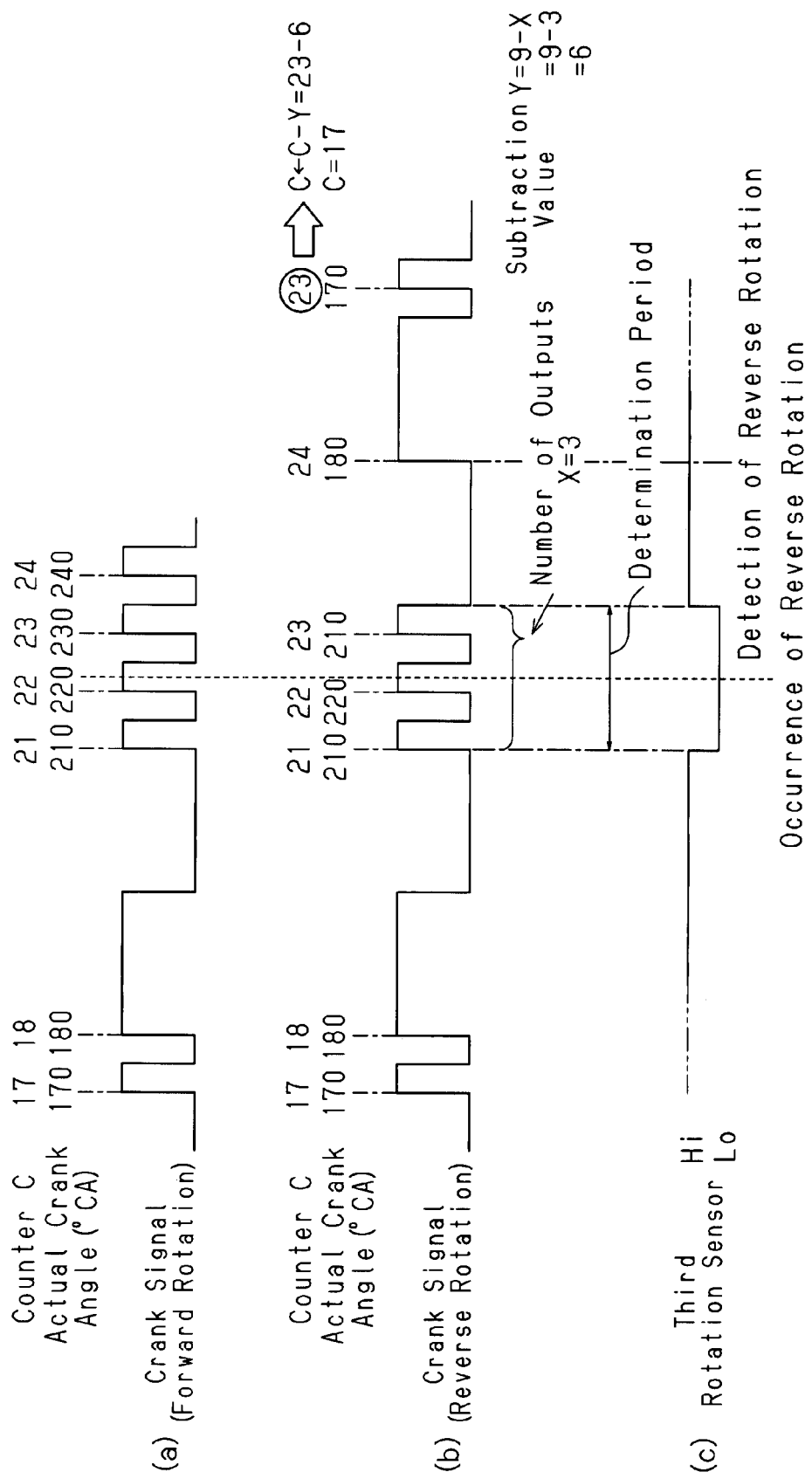
FIG. 18 is a waveform diagram showing output patterns, in which section (a) shows the output pattern of the crank signal during the forward rotation, section (b) shows the output pattern of the crank signal when reverse rotation occurs in a range between 220° CA and 225° CA, and section (c) shows the output pattern of a signal from the third rotation sensor at the time of the occurrence of reverse direction.
Figure 19:
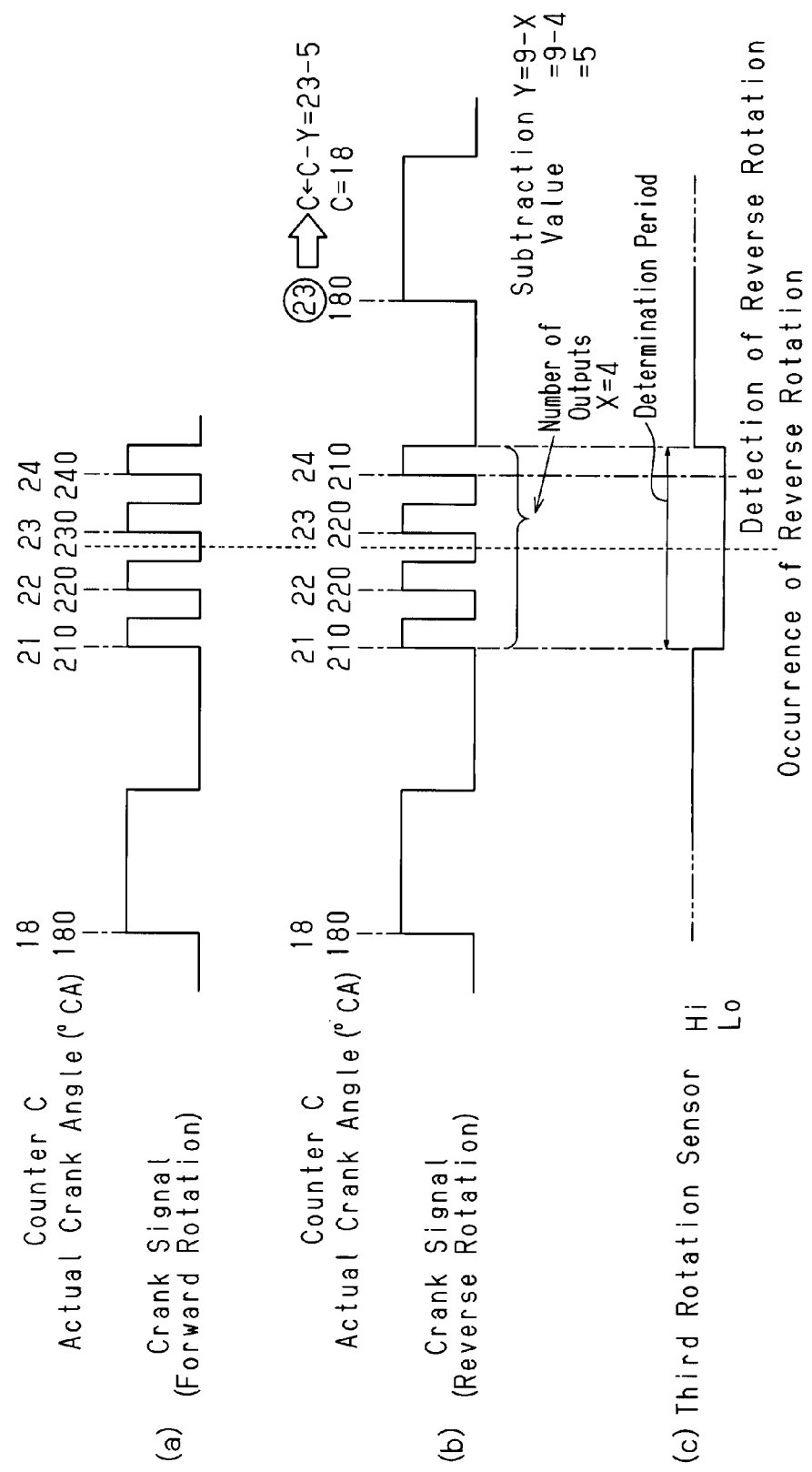
FIG. 19 is a waveform diagram showing output patterns, in which section (a) shows the output pattern of the crank signal during the forward rotation, section (b) shows the output pattern of the crank signal when reverse rotation occurs in a range between 225° CA and 230° CA, and section (c) shows the output pattern of a signal from the third rotation sensor at the time of the occurrence of reverse direction.
Figure 20:
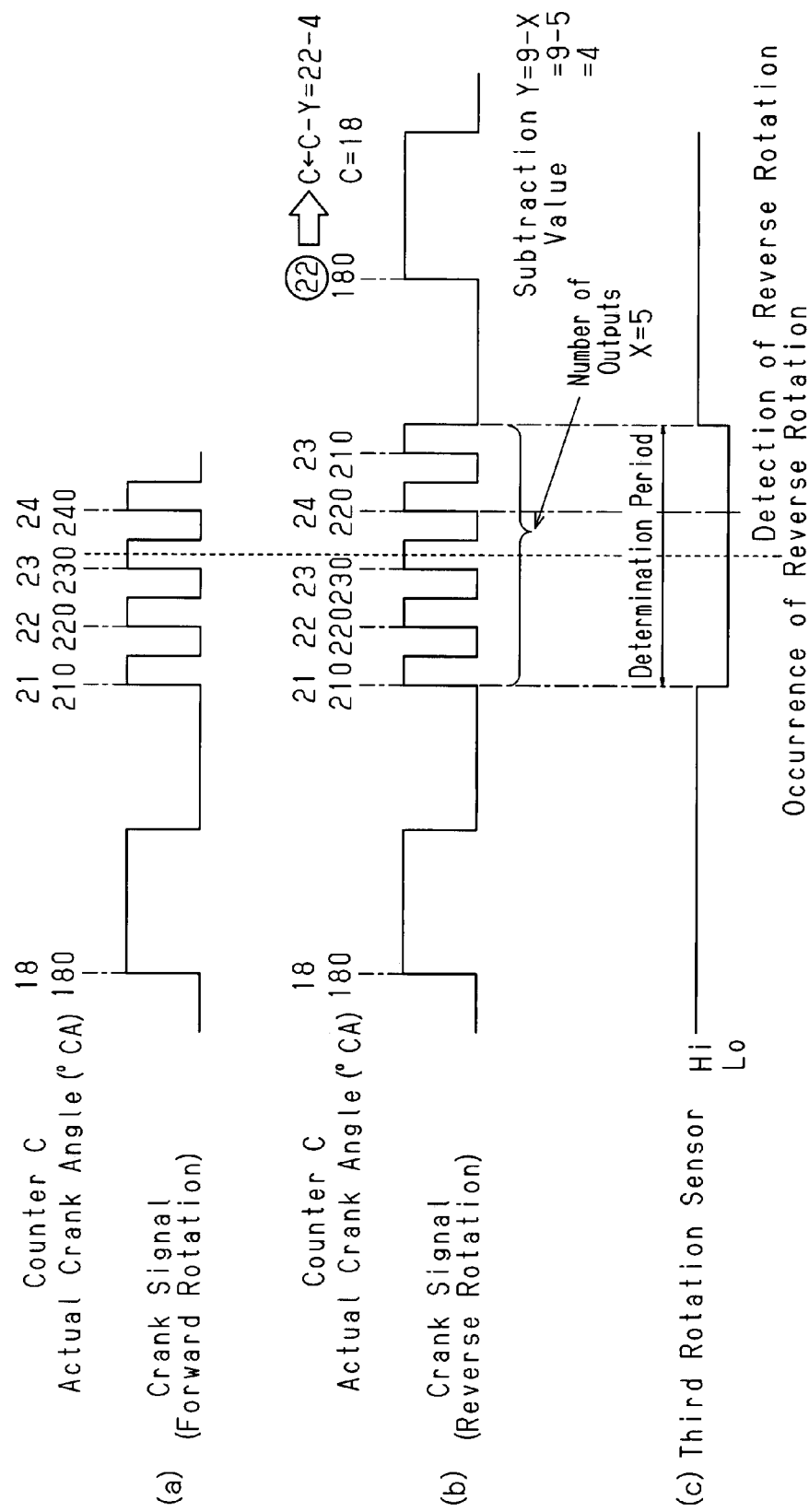
FIG. 20 is a waveform diagram showing output patterns, in which section (a) shows the output pattern of the crank signal during the forward rotation, section (b) shows the output pattern of the crank signal when reverse rotation occurs in a range between 230° CA and 235° CA, and section (c) shows the output pattern of a signal from the third rotation sensor at the time of the occurrence of reverse direction.

If reverse rotation occurs in the period corresponding to the crank angle between 210° and 215° (FIG. 16), the output pattern of the crank signal after the occurrence of reverse rotation will be an output pattern that is obtained by flipping the output pattern before the occurrence of the reverse rotation relative to broken line shown in section (b) of FIG. 16. The signal from the third rotation sensor 20 has a falling edge at 210° CA, which is immediately before the occurrence of reverse rotation. The output pattern of the signal from the third rotation sensor 20 after the occurrence of reverse rotation is also obtained by flipping the output pattern before the occurrence of the reverse rotation relative to the broken line. Therefore, the signal from the third rotation sensor 20 has a rising edge immediately after the occurrence of reverse rotation.

When reverse rotation occurs as described above, the engine 1 rotates in reverse with the counter C being 21. Thereafter, although the first output of the crank signal corresponds to the tooth missing portion 13b, the first output of the crank signal is regarded as corresponding to the projection 13a, and the counter C is incremented by 1. At this time, although the actual crank angle diminishes from 210° to 180° in accordance with the reverse rotation, the counter C increases from 21 to 22. Thereafter, until the point in time where the occurrence of reverse rotation is determined next time (time at which C=24), the actual crank angle is reduced in the order 170°, 160° at every output of the crank signal, while the counter C is increased in the order 23, 24 at every output of the crank signal. When the counter C reaches 24, the occurrence of reverse rotation is detected. Thereafter, the counter C is decremented at every output of the crank signal. Therefore, at the first output of the crank signal after the occurrence of reverse rotation is detected, the counter C is decremented from 24 by 1 and becomes 23. However, since the actual crank angle is 150° in this state, the counter C should have 15 that corresponds to 150° CA. The value of the counter C is therefore displaced by 8 from the proper value.

Such a discrepancy between the counter C and the actual crank angle is caused by a time lag between the actual occurrence of reverse rotation and the detection of the reverse rotation. The discrepancy thus increases as the time lag increases. The time lag corresponds to the period from the theoretical falling point in time (210° CA) of the signal from the third rotation sensor 20 immediately before the occurrence of reverse rotation to the next rising edge of the signal (the determination period). The time lag increases as the determination period becomes shorter. The length of the determination period is extended as the number of outputs X of the crank signal during the determination period increases. Therefore, the number of outputs X is a parameter corresponding to the discrepancy between the counter C and the actual crank angle. In this case, the number of outputs X is 1.

Based on the number of outputs X, the subtraction value Y that corresponds to the discrepancy between the counter C and the actual crank angle is computed. In this case, the subtraction value Y is 8. Specifically, the subtraction value Y is computed based on the expression Y=9−X, in which 1 is used as the number of outputs X. Thus computed subtraction value Y is 8. The counter C is decremented by the subtraction value Y and becomes 15. The discrepancy between the counter C and the actual crank angle (150° CA) is thus eliminated, so that the counter C corresponds to the actual crank angle.

FIGS. 17 to 21 show the output patterns of the crank signal (sections (b)) and the output patterns of the third rotation sensor 20 (sections (c)) in the cases where the occurrence of reverse rotation (broken line) is in the period between 215° and 220°, the period between 220° and 225°, the period between 225° and 230°, the period between 230° and 235°, and the period between 235° and 240°.

As shown in the diagrams, the time lag between the actual occurrence of reverse rotation and the detection of the reverse rotation is extended as the point in time of the occurrence approaches the next actual rising point in time of the signal from the third rotation sensor 20. Accordingly, as the occurrence of reverse rotation approaches the point in time at which C=24, the determination period is extended, and the number of outputs X increases. Specifically, the number of outputs X increases in the order 2, 3, 4, 5, 6 as the point in time at which reverse rotation occurs changes in the order as follows: a point in the period from 215° to 220°, a point in the period from 220° to 225°, a point in the period from 225° to 230°, a point in the period from 230° to 235°, and a point the period from 235° to 240°. Based on the expression Y=9−X, in which the number of outputs X is used, the subtraction value Y is computed. The subtraction value Y is subtracted from the counter C immediately after the end of the determination period. Accordingly, as in the case where reverse rotation occurs in the period from 210° to 215°, the discrepancy between the counter C and the actual crank angle is eliminated, so that the counter C corresponds to the actual crank angle.

Figure 22:
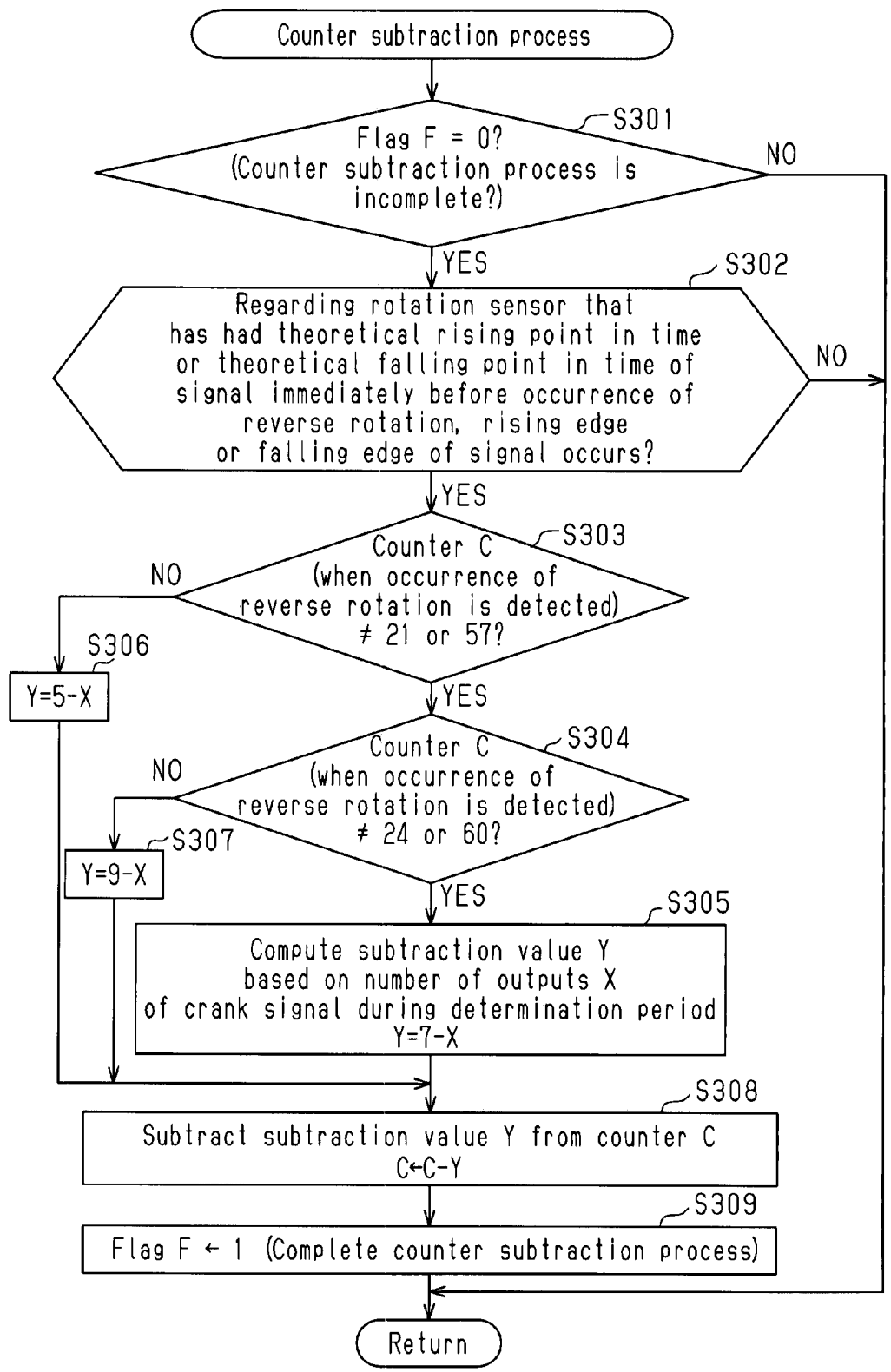
FIG. 22 is a flowchart showing the procedure for executing a counter subtraction process.

The detailed description of the procedure of the counter subtraction process (S208 in FIG. 7) will now be given with reference to the flowchart of FIG. 22 representing a counter subtraction process routine. The counter subtraction process routine is executed by the engine control computer 11 every time the computer 11 proceeds to step S208 in the counter computation routine of FIG. 7.

In this routine, whether flag F is 0 (incomplete) is determined (S301). The flag F represents whether the counter subtraction process has been performed by the time the engine is stopped. If the decision outcome is positive, regarding a rotation sensor that has had a theoretical rising point in time or a theoretical falling point in time of the signal immediately before the occurrence of reverse rotation, whether the signal from the sensor has had a rising edge or a falling edge is determined (S302). If the decision outcome is positive, the determination period is determined to have ended. Based on the number of outputs X during the determination period, the process (S303 to S307) is executed for computing the subtraction value Y for each of the cases [1] to [3].

Specifically, when determining that the counter C at the time of detection of the occurrence of reverse rotation is not 21 or 57, that is, when determining that the current state is not the case [2] at step S303, the engine control computer 11 proceeds to step S304. When determining that the counter C at the time of detection of the occurrence of reverse rotation is not 24 or 60, that is, when determining that the current state is not the case [3] at step S304, the engine control computer 11 determines that the current state is the case [1] and proceeds to step S305. In this process, based on the number of outputs X of the crank signal during the determination period, the subtraction value Y is computed by using the expression Y=7−X (S305). Further, if the counter C when the occurrence of reverse rotation is detected is 21 or 57 (NO at S303), that is, when the current state is the case [2], the subtraction value Y is computed based on the expression Y=5−X, using the number of outputs X of the crank signal during the determination period (S306). Further, if the counter C when the occurrence of reverse rotation is detected is 24 or 60 (NO at S304), that is, when the current state is the case [3], the subtraction value Y is computed based on the expression Y=9−X, using the number of outputs X of the crank signal during the determination period (S307).

After being computed, the subtraction value Y is subtracted from the counter C (S308). Thereafter, flag F is set to 1 (complete), and the process of steps S302 to S308 (counter subtraction process) is not executed. The flag F is set to 0 (incomplete), or the initial value, when the engine 1 stops.

The above described embodiment has the following advantages.

(1) To detect the occurrence of reverse rotation during the stopping process of the engine 1, the first to third rotation sensors 18 to 20 are used, which are provided on the electric motor 10 for driving the variable valve timing mechanism 9. The rotation sensors 18 to 20 are provided for controlling the electric motor 10 to execute the intake valve timing control. Since the existing sensors, which are the first to third rotation sensors 18 to 20, are used to detect the occurrence of reverse rotation of the engine 1, additional sensors or rotors do not need to be provided to detect the occurrence of reverse rotation.

(2) The first to third rotation sensors 18 to 20 are provided about the motor rotor 17 at equal intervals, and the rising edges and falling edges of the signals from the sensors 18 to 20 occur at relatively short intervals of 30° of crank angle during forward rotation of the engine 1. During reverse rotation of the engine 1, the timings of the rising edges and falling edges of the signals become different from those during forward rotation, that is, the output patterns of the signals are promptly changed. Therefore, based on the changes of the output patterns, the occurrence of reverse rotation is promptly detected.

(3) Whether the output patterns of the signals from the first to third rotation sensors 18 to 20 are changed from those during forward rotation is determined based on whether the rising edges and falling edges of the signals actually occur at the theoretical rising and falling points in time of the signals that are determined based on the crank signal. When reverse rotation occurs, the rising edges and falling edges of the corresponding signal do not actually occur even if the above mentioned points in time come. Therefore, based on the above mentioned determination, the variation of the output patterns of the signals from the rotation sensors 18 to 20 from those during forward rotation, in other words, the occurrence of reverse rotation of the engine 1 is accurately detected.

(4) When reverse rotation is detected during the stopping process of the engine 1, the counter C for acquiring the crank angle is decremented at every output of the crank signal. Thus, after the occurrence of reverse rotation is detected, the counter C is reduced at every output of the crank signal in correspondence with the actual crank angle, which is reduced at every output of the crank signal. However, there is a time lag between the actual occurrence of reverse rotation and the detection of the reverse rotation. This delays the start of decrement of the counter C. As a result, during the period corresponding to the time lag, the counter C is incremented despite the fact that the engine 1 is rotating in reverse. This creates a discrepancy between the counter C and the actual crank angle. However, the discrepancy between the counter C and the actual crank angle due to the time lag between the occurrence of reverse rotation and the detection of the reverse rotation is eliminated by computing the subtraction value Y, which corresponds to the discrepancy, and subtracting the subtraction value Y from the counter C. By performing such a counter subtraction process, the counter C is permitted to correspond to the actual crank angle. Thus, even if reverse rotation occurs during the stopping process of the engine 1, the counter C when the crankshaft 6 stops is permitted to reliably correspond to the actual crank angle. The value of the counter C at this time is stored and will be used as the initial value of the counter C in the subsequent starting of the engine 1. Therefore, when the starting of the engine 1 is initiated, the crank angle acquired based on the counter C will be accurate. This permits the first fuel injection and ignition to be performed at an appropriate time (crank angle) at an early stage after the engine starting is initiated. This improves the starting performance of the engine 1.

(5) The subtraction value Y, which is used for subtraction of the counter C for eliminating the discrepancy between the counter C and the actual crank angle, is computed based on a parameter related to the magnitude of the discrepancy, that is, the number of outputs X of the crank signal during the determination period. Therefore, by reducing the counter C by the subtraction value Y, the discrepancy between the counter C and the actual crank angle is appropriately eliminated, so that the counter C when the crankshaft 6 stops accurately corresponds to the actual crank angle.

The above described embodiment may be modified as follows.

The determination for whether the output patterns of the signals from the first to third rotation sensors 18 to 20 are changed from the those during forward rotation may be made using a method other than that described in (3). For example, the state of the signal from each of the rotation sensors 18 to 20 ("Hi" or "Lo") at a given crank angle may be compared with the state during forward rotation of the engine 1. In this case, if the state of the signal differs from that during forward rotation, the output pattern of the signal is detected to be changed from that during forward rotation, in other words, the occurrence of reverse rotation of the engine 1 is detected.

To compute the subtraction value Y as a value that corresponds to the period from the occurrence of reverse rotation to the detection of the reverse rotation, a method other than the one described in the above embodiment may be employed.

The electric motor 10 of the variable valve timing mechanism 9 is exemplified as the rotating electrical machine coupled to the crankshaft 6 and the camshaft, but the present invention is not limited to this. For example, a generator, which is typically coupled to an engine crankshaft, may be used as the rotating electrical machine. In the engine mounted on a hybrid automobile, a motor is coupled to the crankshaft to assist the engine. Such a motor of a hybrid automobile may be used as the rotating electrical machine.

The crank position sensor 14 and the crank rotor 13 do not need to be provided on the crankshaft 6, but may be provided on, for example, the exhaust camshaft 8 to detect the rotation state of the crankshaft 6 based on rotation of the exhaust camshaft 8.

The invention claimed is:

1. A control apparatus for an internal combustion engine, the engine including a crankshaft, a camshaft for actuating a valve of the engine, a crank position sensor that outputs a crank signal every time the crankshaft rotates a certain angle, and a rotating electrical machine having a rotor that is coupled to one of the crankshaft and the camshaft, wherein the control apparatus acquires a crank angle based on a counter that is incremented every time the crank signal is output, and controls the engine based on the acquired crank angle, the apparatus comprising:

a plurality of rotation sensors located about the rotor, each sensor outputting a signal corresponding to induced voltage generated by rotation of the rotor, wherein the control apparatus controls the rotating electrical machine based on the signals from the rotation sensors;

a detection section that detects the occurrence of reverse rotation of the engine when an output pattern of the signals from the rotation sensors is different from an output pattern during forward rotation of the engine, wherein, when the engine is rotating, the detection section determines theoretical rising and falling points in time of the signal from each rotation sensor based on the crank signal, the theoretical rising and falling points in time corresponding to actual rising and falling points in time during forward rotation of the engine, wherein the detection section determines whether each of rising and falling edges of the signal from each rotation sensor is actually occurring at the corresponding theoretical point in time, and detects the occurrence of reverse rotation of the engine when the determination result is negative;

a decrement section that decrements the counter every time the crank signal is output after the occurrence of reverse rotation is detected;

a subtraction section that computes a subtraction value, the subtraction value corresponding to a discrepancy between the counter and the actual crank angle caused by a discrepancy between the actual point in time of the occurrence of reverse rotation and the point in time of the detection of the reverse rotation, wherein the subtraction section reduces the counter by the subtraction value; and an initial value setting section, wherein the initial value setting section stores a count value of the counter at the time of stopping the engine, and sets the stored count value as an initial value of the counter in the subsequent starting of the engine.

2. The apparatus according to claim 1, wherein the subtraction section sets a determination period based on the signal from one of the rotation sensors that has had a theoretical rising point in time or a theoretical falling point in time of the signal most immediately before the occurrence of reverse rotation is detected by the detection section, and computes the subtraction value based on the number of outputs of the crank signal during the determination period.

3. The apparatus according to claim 2, wherein the determination period is a period from a theoretical rising point in time or a theoretical falling point in time of the signal from the rotation sensor most immediately before the detection of the occurrence of reverse rotation to when the signal actually rises or falls.

4. The apparatus according to claim 1, wherein the rotation sensors include three rotation sensors, each rotation sensor outputting a signal that repeats rising edges and falling edges every time the crankshaft rotates 90°, and wherein the signals from the rotation sensors are displaced by 60° of crank angle from one another.

5. The apparatus according to claim 1, wherein the engine includes a variable valve timing mechanism that changes a rotational phase of the camshaft relative to the crankshaft, wherein the rotating electrical machine is an electric motor provided in the variable valve timing mechanism, and wherein the electric motor is coupled to the camshaft to drive the camshaft.

6. The apparatus according to claim 1, further comprising:

a cam position sensor which outputs a cam signal every time the camshaft rotates by a certain angle, wherein the cam signal contains pulses that are used for distinguishing the cylinders of the engine and detecting valve timing of the intake valves.

7. A control method for an internal combustion engine, the engine including a crankshaft, a camshaft for actuating a valve of the engine, and a rotating electrical machine having a rotor that is coupled to one of the crankshaft and the camshaft, the method comprising:
   outputting a crank signal from a crank position sensor every time the crankshaft rotates by a certain angle;
   acquiring a crank angle based on a counter that is incremented every time the crank signal is output, and controlling the engine based on the acquired crank angle;
   outputting, from a plurality of rotation sensors located about the rotor, signals corresponding to induced voltage generated by rotation of the rotor;
   controlling the rotating electrical machine based on the signals from the rotation sensors;
   detecting the occurrence of reverse rotation of the engine when an output pattern of the signals from the rotation sensors is different from an output pattern during forward rotation of the engine, wherein detecting the occurrence of reverse rotation of the engine includes:
      determining, when the engine is rotating, theoretical rising and falling points in time of the signal from each rotation sensor based on the crank signal, the theoretical rising and falling points in time corresponding to actual rising and falling points in time during forward rotation of the engine;
      determining whether each of rising and falling edges of the signal from each rotation sensor is actually occurring at the corresponding theoretical point in time; and
      detecting the occurrence of reverse rotation of the engine when the determination result is negative;
   decrementing the counter every time the crank signal is output after the occurrence of reverse rotation is detected;
   computing a subtraction value that corresponds to a discrepancy between the counter and the actual crank angle caused by a discrepancy between the actual point in time of the occurrence of reverse rotation and the point in time of the detection of the reverse rotation, and reducing the counter by the subtraction value;
   storing a count value of the counter at the time of stopping the engine; and
   setting the stored count value as an initial value of the counter in the subsequent starting of the engine.

8. The method according to claim 7, further comprising:
   setting a determination period based on the signal from one of the rotation sensors that has had a theoretical rising point in time or a theoretical falling point in time of the signal most immediately before the occurrence of reverse rotation is detected; and
   computing the subtraction value based on the number of outputs of the crank signal during the determination period.

9. The method according to claim 8, wherein the determination period is a period from a theoretical rising point in time or a theoretical falling point in time of the signal from the rotation sensor most immediately before the detection of the occurrence of reverse rotation to when the signal actually rises or falls.

10. The method according to claim 7, further comprising:
   outputting a cam signal from a cam position sensor every time the camshaft rotates by a certain angle;
   wherein the cam signal contains pulses that are used for distinguishing the cylinders of the engine and detecting valve timing of the intake valves.

* * * * *